(12) United States Patent　　(10) Patent No.: US 12,656,521 B2
　　Rothschild　　　　　　　　　　　(45) Date of Patent: Jun. 16, 2026

(54) MOBILE BACKSCATTER IMAGING SYSTEM WITH DUAL-SIDED INSPECTION

(71) Applicant: Viken Detection Corporation, Burlington, MA (US)

(72) Inventor: Peter J. Rothschild, Newton, MA (US)

(73) Assignee: VIKEN DETECTION CORPORATION, Burlington, MA (US)

( * ) Notice: Subject to any disclaimer, the term of this patent is extended or adjusted under 35 U.S.C. 154(b) by 193 days.

(21) Appl. No.: 18/260,498

(22) PCT Filed: Jan. 7, 2022

(86) PCT No.: PCT/US2022/070098
§ 371 (c)(1),
(2) Date: Jul. 6, 2023

(87) PCT Pub. No.: WO2022/150844
PCT Pub. Date: Jul. 14, 2022

(65) Prior Publication Data
US 2024/0053505 A1　　Feb. 15, 2024

Related U.S. Application Data

(60) Provisional application No. 63/135,410, filed on Jan. 8, 2021.

(51) Int. Cl.
*G01V 5/222* (2024.01)

(52) U.S. Cl.
CPC .................................... *G01V 5/222* (2024.01)

(58) Field of Classification Search
CPC .......... G01V 5/22; G01V 5/222; G01V 5/224; G01V 5/232; G01V 5/0016; G01V 5/0025;

(Continued)

(56) References Cited

U.S. PATENT DOCUMENTS

| | | | | |
|---|---|---|---|---|
| 5,838,759 A | * | 11/1998 | Armistead | ............. G01V 5/281 |
| | | | | 378/57 |
| 6,542,580 B1 | * | 4/2003 | Carver | ................... G01N 23/04 |
| | | | | 378/57 |

(Continued)

FOREIGN PATENT DOCUMENTS

| | | |
|---|---|---|
| EP | 3112851 A1 | 1/2017 |
| WO | 2011/103097 A1 | 8/2011 |
| WO | 2016/081881 A1 | 5/2016 |

OTHER PUBLICATIONS

European Patent Office, International Search Report and Written Opinion dated May 6, 2022, issued in PCT application No. PCT/US2022/070098, 16 pages.

(Continued)

*Primary Examiner* — Irakli Kiknadze
(74) *Attorney, Agent, or Firm* — Merchant & Gould P.C.

(57) ABSTRACT

An x-ray inspection system includes a vehicle, a mobile conveyance, and first and second x-ray scanning modules. The first module is transportable directly or indirectly, via a transport of the vehicle, to an inspection site, and it can irradiate a near side of an object to be inspected at the site with a first x-ray scanning beam. The second scanning module is transportable to the inspection site via a combination of the mobile conveyance and the vehicle, and the second module is movable and positioned at the inspection site, via the mobile conveyance, to irradiate a far side of the object with a second x-ray scanning beam. The vehicle and the mobile conveyance are configured to be mechanically coupled together during the transport and to be mechanically decoupled from each other at the inspection site. The system enables dual-sided x-ray backscatter inspection using a mobile platform.

23 Claims, 15 Drawing Sheets

(58) Field of Classification Search
 CPC ...... G01V 5/0066; G01V 5/0041; G01V 5/20;
 G01V 5/0008; G01V 5/26; G01V 5/0075;
 G01N 23/20; G01N 23/04; G01N 23/02;
 G01N 23/083; G01N 23/203; G01N
 2223/631; G01N 2223/646; G01N
 2223/3301; G01N 2223/639; G01N
 23/20008; G01N 2223/053; G01N
 2223/308; G01N 2223/045; G01N
 2223/1016; G01N 2223/40; G01N
 2223/301; G01N 23/10; G01N 23/20066;
 G01N 2223/063; G21K 5/10; G21K
 1/043; H01J 35/18; H05G 1/02; H05G
 1/06; G01T 1/20; G01T 7/00; G01T 3/06;
 G01T 1/20181; G01T 5/08; G01T
 1/20185; G01T 1/2006; G01T 1/2008;
 H10F 39/18; H10F 39/12; H10F 39/80;
 H10F 39/189
 USPC .............................................. 378/57, 70, 87
 See application file for complete search history.

(56) References Cited

U.S. PATENT DOCUMENTS

| | | | | |
|---|---|---|---|---|
| 9,025,731 | B2 * | 5/2015 | Kotowski ................ | G01V 5/20 378/147 |
| 2003/0016790 | A1 | 1/2003 | Grodzins et al. | |
| 2011/0064192 | A1 | 3/2011 | Morton et al. | |
| 2014/0211916 | A1 | 7/2014 | Morton | |

OTHER PUBLICATIONS

Rapiscan Systems/AS&E; "ZBV, Mobile Z Backscatter Cargo and Vehicle Screening System", 3 pages, downloaded on Oct. 19, 2023; https://www.rapiscan-ase.com/products/mobile/zbv-cargo-and-vehicle-screening.

Defense Daily, "AS&E Introduces Mobile High Energy Cargo and Vehicle Inspection System", Sep. 29, 2009, 2 pages, downloaded on Nov. 13, 2023; https://www.defensedaily.com/ase-introduces-mobile-high-energy-cargo-and-vehicle-inspection-system/homeland-security/.

Security Infowatch.com; "Middle East government agency awards AS&E order to updgrade their ABV Fleet with Tx-View fo use in counterterrorism application", Apr. 25, 2016, 4 pages, downloaded on Nov. 13, 2023; https://www.securityinfowatch.com/perimeter-security/press-release/12198798/american-science-engineering-middle-east-government-agency-awards-ase-order-to-upgrade-their-zbv-fleet-with-txview-for-use-in-counterterrorism-applications.

* cited by examiner

Mobile Conveyance Electric Cart 1004

Controls 1144

Handle 1142

Power Supply 1142

Pivoting Wheels 1140

Motorized Wheels 1138

Rotating Loop 1874

1880

Rotating Wheel 1872

1880

X-Ray Tube 1880

Fan Beam 1878

Rotating Disk 1870

Motor 1876

MOBILE BACKSCATTER IMAGING SYSTEM WITH DUAL-SIDED INSPECTION

RELATED APPLICATION(S)

This application is the U.S. National Stage of PCT Application No. PCT/US2022/070098, filed on Jan. 7, 2022, which claims the benefit of U.S. Provisional Application No. 63/135,410, filed on Jan. 8, 2021. The entire teachings of the above application(s) are incorporated herein by reference.

BACKGROUND

X-ray backscatter imaging has been used for detecting concealed contraband, such as drugs, explosives, and weapons, since the late 1980's. Unlike traditional transmission x-ray imaging that creates images by detecting the x-rays penetrating through an object, backscatter imaging uses reflected or scattered x-rays to create the image.

SUMMARY

Deployed fixed-site systems have provided dual-sided or three-sided backscatter images of vehicles and shipping containers, by using an ability to acquire images of the undercarriage and both sides of a vehicle driven through a portal system.

There are currently no mobile backscatter imaging systems that provide backscatter images from both sides of a vehicle. To detect concealed contraband throughout the entirety of an inspected vehicle, it is advantageous to be able to acquire backscatter images from both sides, rather than from just one side of the vehicle. Even if an additional top-down or undercarriage backscatter view is acquired, inspection from only the left or the right side of the vehicle will often allow some of any concealed contraband to remain undetected.

Embodiments described herein provide for a fully self-contained mobile backscatter imaging system that advantageously provides backscatter imaging from both near and far sides of an object to be inspected, such as from the left and right sides of a vehicle to be inspected (also referred to herein as "scanned vehicle," which can include tractor trailers, large trucks, small trucks, cars, motorcycles, and other objects that it is desirable to inspect).

One of the x-ray scanning modules and its associated backscatter detector(s) can be mounted on or within a main mobile vehicle (also referred to herein as "system vehicle," "scanning vehicle," or "vehicle"), which advantageously can be a van or small truck. The second x-ray scanning module and its associated backscatter detector(s) can be located separately from the vehicle by mounting them on or within a trailer that is towed behind the vehicle, or by mounting them on a small cart (or some other man-portable platform) that is transported in the vehicle or in a trailer towed behind the vehicle. In these examples, the system is fully mobile and fully self-contained, and other embodiments described herein can also provide these features.

Once the inspection location is reached, the vehicle can be parked so that the first x-ray scanning module and its associated detectors can provide backscatter images of the near side of vehicles or other objects passing the vehicle. If the second x-ray scanning module is mounted within or on a trailer, the trailer is unhitched from the vehicle and positioned so that the x-ray scanning module within the trailer can provide backscatter images of the far side of the inspected vehicle or object. If the second scanning module is mounted on an electric cart (or some other man-portable platform), the cart is positioned so that the x-ray scanning module on the cart can provide backscatter images of the far side of the inspected vehicle or object.

In one specific embodiment, an x-ray inspection system includes a vehicle; a first x-ray scanning module configured to be transportable, via a transport of the vehicle, to an inspection site, the first x-ray scanning module further configured to irradiate, with a first x-ray scanning beam, a near side of an object to be inspected at the inspection site; a mobile conveyance; and a second x-ray scanning module configured to be transportable to the inspection site via a combination of the mobile conveyance and the vehicle, the second x-ray scanning module further configured to be movable and positioned at the inspection site, via the mobile conveyance, to irradiate, with a second x-ray scanning beam, a far side of the object to be inspected, wherein the vehicle and the mobile conveyance are configured to be mechanically coupled together during the transport to the inspection site and to be mechanically decoupled from each other at the inspection site.

The mobile conveyance can be a cart, and the second x-ray scanning module can be configured to be mechanically coupled to the cart during the transport and during the irradiation with the second x-ray scanning beam, the cart configured to be removable, with the second x-ray scanning module, from the vehicle at the inspection site.

The first x-ray scanning module can be configured to be mounted at the vehicle during the transport and during the irradiation with the first x-ray scanning beam.

The mobile conveyance can be a first mobile conveyance, and the system can further include a second mobile conveyance configured to be mechanically coupled to the vehicle during the transport to the inspection site and to be mechanically decoupled from the vehicle at the inspection site. The first x-ray scanning module can be configured to be moveable and positioned at the inspection site, via the second mobile conveyance, to irradiate, with the first x-ray scanning beam, the near side of the object to be inspected.

The second mobile conveyance can be a cart, and the first x-ray scanning module can be configured to be mechanically coupled to the cart during the transport and during the irradiation with the first x-ray scanning beam. The cart can be configured to be removable, with the first x-ray scanning module, from the vehicle at the inspection site.

The system can further include a trailer configured to be pulled by the vehicle during the transport, and the mobile conveyance can be configured to be secured at the trailer during the transport and to be removable from the trailer at the inspection site.

The mobile conveyance can be a first mobile conveyance and can be a trailer configured to be pulled by the vehicle during the transport. The second x-ray scanning module can be configured to be mechanically coupled to the trailer during the transport and during the irradiation with the second x-ray scanning beam.

The first x-ray scanning module can be configured to be mounted at the vehicle during the transport and during the irradiation with the first x-ray scanning beam.

The first x-ray scanning module can be configured to be mechanically coupled to a cart during the transport and during the irradiation with the first x-ray scanning beam, and the cart can be configured to be mechanically coupled to the vehicle or to the trailer during the transport and to be mechanically decoupled from the vehicle or from the trailer at the inspection site.

The system can further include a trailer configured to be towed by the vehicle for the transport to the inspection site, and the mobile conveyance can be a first mobile conveyance. The system can further include a second mobile conveyance, the first x-ray scanning module configured to be movable and positioned, via the second mobile conveyance, to irradiate, with the first x-ray scanning beam, the near side of the object to be inspected at the inspection site. The first and second mobile conveyances can be configured to be mechanically coupled to the trailer during the transport to the inspection site and to be mechanically decoupled from the trailer, with the second and first x-ray scanning modules, respectively, at the inspection site for the irradiation with the second and first x-ray scanning beams, respectively.

The first x-ray scanning module, the second x-ray scanning module, or both can incorporate a tilted disk chopper wheel assembly.

The system can further include a transmission detector configured to detect x-rays from the first or second x-ray scanning beam that are transmitted through the object. The transmission detector can be mounted to a trailer that is configured to be towed by the vehicle during the transport. The transmission detector can be mounted to the conveyance. The transmission detector can be a dual-energy detector. The transmission detector can be configured to be stowed, during the transport, in the vehicle or in a trailer that is configured to be towed by the vehicle during the transport.

The first and second x-ray scanning modules can be configured to output the first and second x-ray scanning beams, respectively, to be temporally interleaved with each other.

The system can further include a third x-ray scanning module that is configured to be transported to the inspection site by the vehicle or by a trailer that is configured to be towed by the vehicle during the transport. The third x-ray scanning module can be configured to be positioned at an underside of the object and to output a third x-ray scanning beam toward the underside.

The system can further include one or more first backscatter detectors configured to produce a first detector signal in response to radiation scattered from the near side of the object; one or more second backscatter detectors configured to produce a second detector signal in response to radiation scattered from the far-side of the object; and one or more image generators configured to create a first backscatter image from the first detector signal and a second backscatter image from the second detector signal.

In another embodiment, an x-ray inspection system includes: a trailer configured to be towed by a vehicle for a transport to an inspection site; a first x-ray scanning module configured to be transportable, via the trailer, to the inspection site, the first x-ray scanning module further configured to irradiate, with a first x-ray scanning beam, a near side of an object to be inspected at the inspection site; a second x-ray scanning module; and a mobile conveyance configured to be mechanically coupled to the trailer during the transport to the inspection site and to be mechanically decoupled from the trailer, with the second x-ray scanning module, at the inspection site, wherein the second x-ray scanning module is configured to be movable via the mobile conveyance and to be positioned, via the mobile conveyance, to irradiate, with a second x-ray scanning beam, a far side of the object to be inspected.

The first x-ray scanning module can be configured to be mechanically coupled to the trailer during the transport to the inspection site and during the irradiation of the near side of the object with the first x-ray scanning beam.

The mobile conveyance can be a first mobile conveyance. The system can further include a second mobile conveyance configured to be mechanically coupled to the trailer during the transport to the inspection site and to be mechanically decoupled from the trailer, with the first x-ray scanning module, at the inspection site, the first x-ray scanning module configured to be movable and positioned, via the second mobile conveyance, to irradiate, with the first x-ray scanning beam, the near side of the object to be inspected.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

Figure 1:
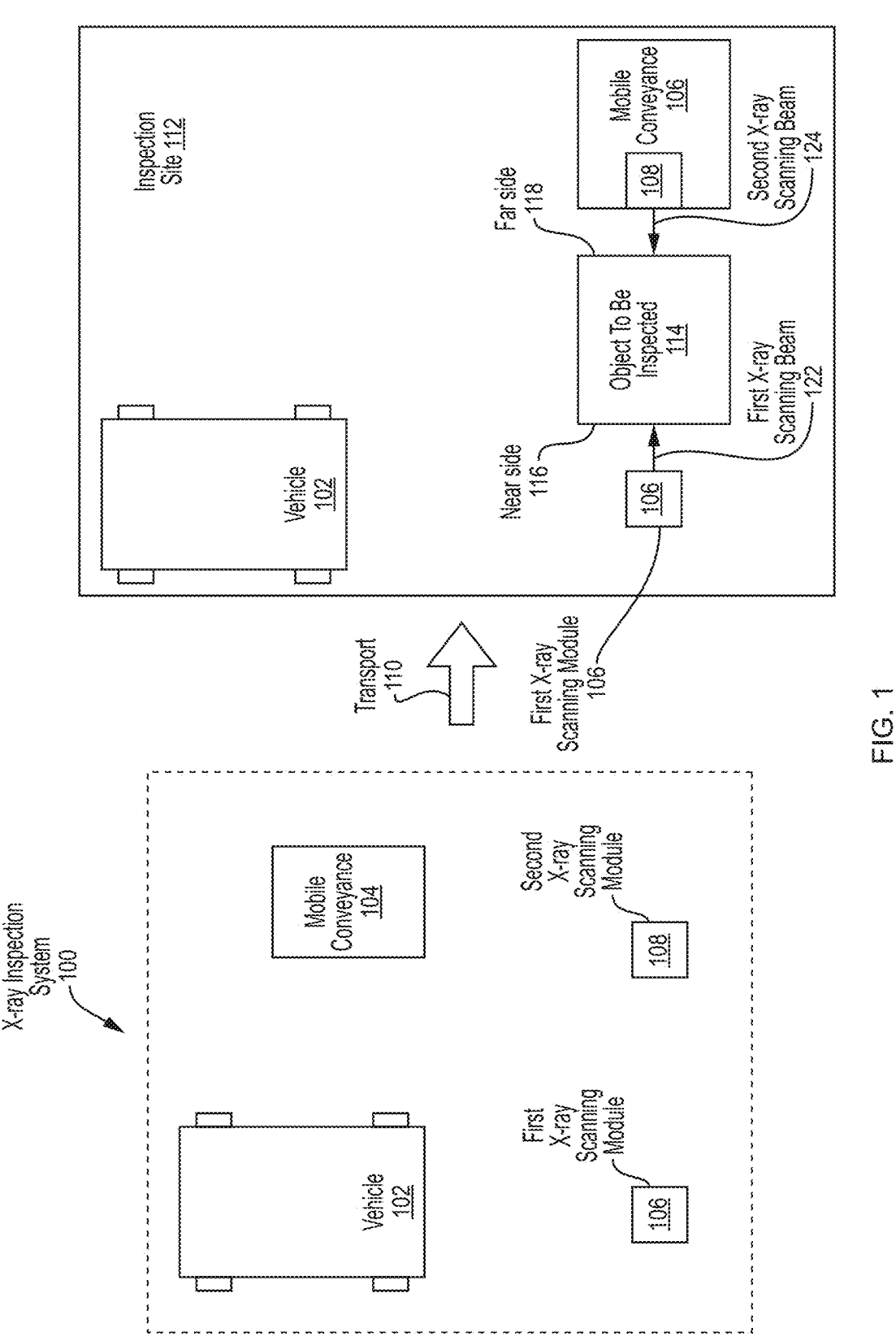
FIG. 1 is a schematic diagram of an embodiment x-ray inspection system including a vehicle, a mobile conveyance, and two x-ray scanning modules, and FIG. 1 also illustrates a use of certain system components at an inspection site.

FIG. 1 is a schematic diagram illustrating an embodiment x-ray inspection system 100 in its most general form, along with its use at an inspection site 112. The system 100 includes a vehicle 102, a mobile conveyance 104, a first x-ray scanning module 106, and a second x-ray scanning module 108.

The vehicle 102 can be a tractor-trailer rig, a large truck, or any other vehicle that is capable of performing the functions noted hereinafter for a transport 110 to the inspection site 112, and, optionally, for other functions as will be understood by reference to the various embodiments described hereinafter. In preferred embodiments, the vehicle 102 is a small truck or van.

The mobile conveyance 104 can be a manually operated cart, an electric cart as described in connection with FIGS. 13A-13B, for example, a trailer, such as described in connection with FIGS. 5-6, for example, or another motorized or nonmotorized conveyance by which the second x-ray scanning module 108 can be movable and positioned at the inspection site, as detailed hereinafter.

Figure 2:
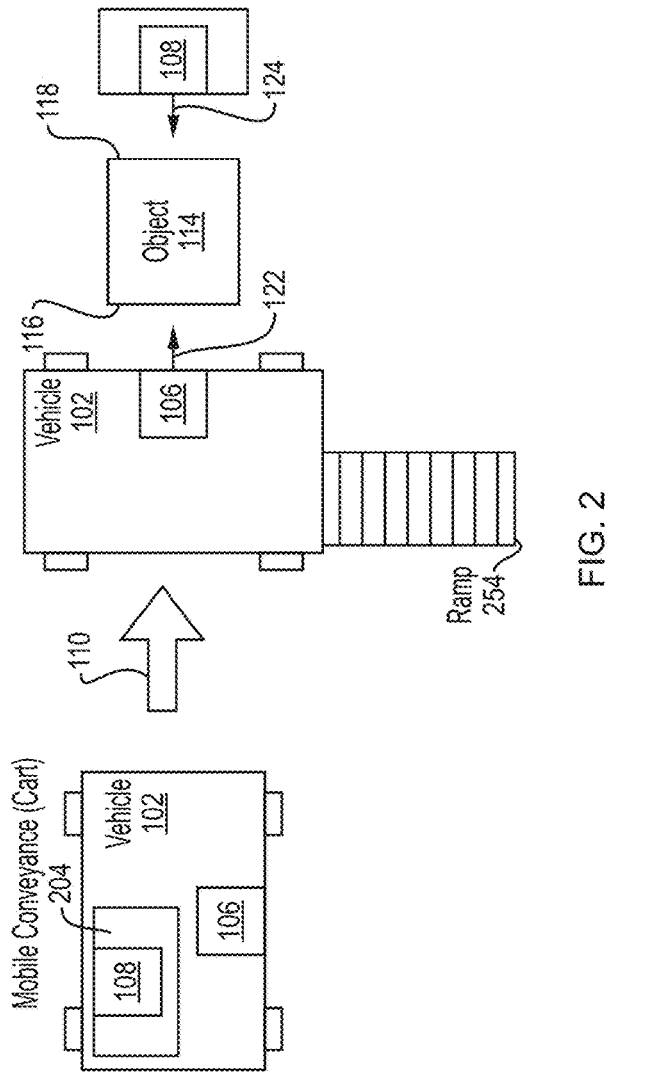
FIG. 2 is a schematic diagram illustrating components of an embodiment x-ray inspection system with a first x-ray scanner mounted to a vehicle and a second x-ray scanner mounted on a mobile conveyance that is removed from the vehicle at the inspection site.
Figure 3:
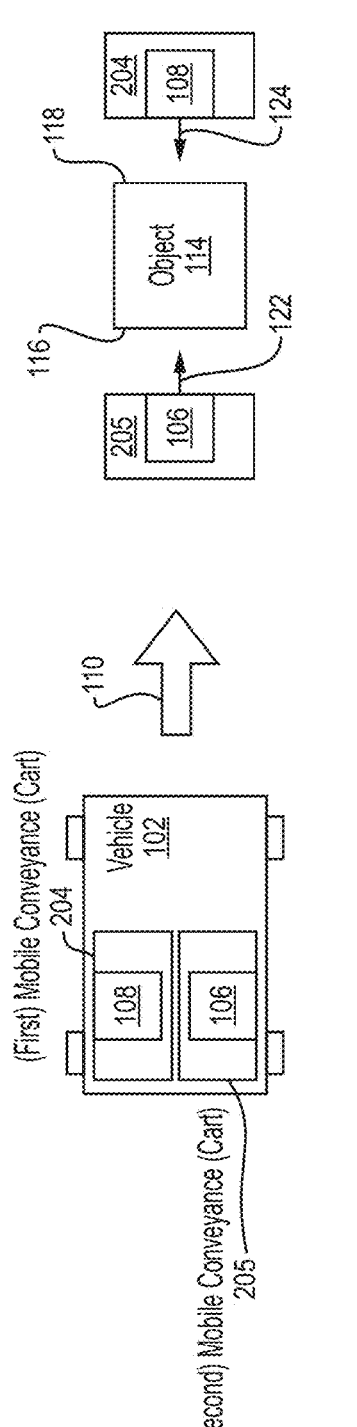
FIG. 3 is a schematic diagram illustrating components of an embodiment x-ray inspection system with two mobile conveyances held in the vehicle for transport.

The first x-ray scanning module 106 is configured to be transportable, via a transport of the vehicle 102, to the inspection site 112. The first x-ray scanning module 106 is further configured to irradiate, with a first x-ray scanning beam 122, a near-side 116 of an object 114 that is to be inspected at the inspection site 112. In some embodiments, such as illustrated in FIG. 2, for example, the first x-ray scanning module 106 is transportable via the transport of the vehicle 102 by being coupled to the vehicle both during the transport and during the irradiation of the object 114 with the first x-ray scanning beam 122 at the inspection site 112. However, in other embodiments, such as illustrated in FIGS. 3 and 6-7, for example, the first x-ray scanning module 106 is configured to be transportable via the transport of the vehicle indirectly, such as being directly coupled to a second mobile conveyance that is transported in the vehicle or in a trailer towed by the vehicle, or by being directly coupled to (such as mounted in) the trailer towed by the vehicle.

As used herein, an "x-ray scanning module" includes an x-ray source such as an x-ray tube that is configured to output a substantially static, stationary x-ray beam, together with a means for converting the stationary beam into a scanning x-ray beam. The scanning means can include a rotating disk, a rotating wheel, or a rotating hoop, for example. Various examples are described in connection with FIGS. 18A-18C and 19-20. In general, embodiment x-ray inspection systems can include additional components, such as backscatter x-ray detectors, such as those illustrated in FIG. 10A. Systems may also include transmission x-ray imaging capability, as will be understood by those skilled in the art, and as described in other embodiments.

The second x-ray scanning module 108 is configured to be transportable to the inspection site via a combination of the mobile conveyance 104 and the vehicle 102. In some embodiments, where the mobile conveyance 104 is a cart, the second x-ray scanning module may be transportable via being coupled to the cart, where the cart is held in, on, or otherwise secured to the vehicle 102 or to a trailer, for example. In other embodiments, such as in FIG. 5, for example, the mobile conveyance 104 is a trailer towed by the vehicle 102 to the inspection site. The second x-ray scanning module 108 can be coupled to the trailer both during the transport and during the inspection process, as illustrated at the right side of FIG. 5, for example. In that manner, the second x-ray scanning module 108 is configured to be transportable to the inspection site via the combination of the mobile conveyance and the vehicle 102.

The second x-ray scanning module 108 is further configured to be movable and positioned at the inspection site 112, via the mobile conveyance 104, such that a second x-ray scanning beam 124 emanating from the second x-ray scanning module 108 can irradiate a far side 118 of the object 114 to be inspected. Where the mobile conveyance 104 is a cart, such as a manual cart or an electric cart, the second x-ray scanning module 108 can be mechanically coupled to the cart both during the transport to the inspection site and during the irradiation of the object 114 with the second beam 124. The cart can be moved off of or out of the vehicle 102 or a trailer pulled by the vehicle 102 and positioned adjacent to the far side 118 at the inspection site in order to achieve this purpose. Alternatively, where the mobile conveyance 104 is a trailer, such as illustrated in FIG. 5, for example, the second x-ray scanning module 108 may be coupled mechanically to the trailer, during the transport, and also during the irradiation using the second x-ray scanning beam 124, as illustrated in FIG. 5. The second x-ray scanning module 108 is, thus, configured to be movable and positioned at the inspection site via the trailer, which can be moved by hand, or by the vehicle 102, or by other means at the inspection site.

By "irradiate" or "irradiation" of a near side or far side of the object to be inspected, it is meant direct irradiation, such that a substantial portion of the near or far side of the object to be inspected can be irradiated by the first or second x-ray scanning beam, respectively, without the respective x-ray beams first traversing interior portions of the object to be inspected.

It should be understood that, as used herein, a near side 116 and far side 118 of the object 114 to be inspected are not necessarily flat or planar, but can be sides of an object with contour, shape, etc., as will be understood in reference to common usage of "sides" of a car, for example.

Whether the mobile conveyance 104 is a cart, a trailer, or other type of mobile conveyance, the vehicle 102 and a mobile conveyance 104 are configured to be mechanically coupled together during the transport 110 to the inspection site and to be mechanically decoupled from each other at the inspection site. While the coupling is not illustrated in FIG. 1, since a single illustration cannot adequately convey the embodiments within the scope of this disclosure and the claims, the coupling is illustrated and described in connection with FIGS. 2-9, for example, in various embodiments.

In the case of the mobile conveyance 104 being a cart, the cart may be mechanically coupled to the vehicle directly or indirectly, such as being placed in, on, or secured to or in the vehicle or in a trailer towed by the vehicle. The cart may be mechanically decoupled from the vehicle by being removed from the vehicle 102 or from a trailer pulled by the vehicle 102, such as by lifting, moving down a ramp, and the like. Upon decoupling, there is not a mechanical linkage between the cart and the vehicle 102 that would cause the cart to move synchronously if the vehicle 102 were moved. Where cables are used between a vehicle or trailer and a cart, such as signal cables or electrical power cables, for example, such cables or other insubstantial linkages do not constitute the "mechanically coupled together" referred to herein. Where the mobile conveyance 104 is a trailer, such as in the example of FIG. 5, the mobile conveyance may be coupled to the vehicle 102 via a standard hitch or other secure means to transport the trailer by means of the vehicle 102 on roads. Mechanical decoupling between a trailer mobile conveyance and a vehicle 102 can occur by unhitching the trailer from the vehicle 102.

As used herein, by the second x-ray scanning module being configured to be movable and positioned at the inspection site via the mobile conveyance, should be understood to mean movable and positioned via the mobile conveyance, at the inspection site, either with assistance from the vehicle or other means, such as human means, such as via an automated robotic or vehicular means, while the second x-ray scanning module remains mechanically coupled to the mobile conveyance, such as in, on, strapped or bolted to, sitting on, or otherwise coupled to the mobile conveyance. In one example, the vehicle 102 tows a trailer mobile conveyance to the far side of a car lane with the second x-ray scanning module in the trailer, positions the trailer appropriately for scanning the far side, and then the trailer is unhitched, and the vehicle 102 moves away from the trailer.

FIGS. 2-9 generally illustrate various, more particular optional features and configurations of the system 100 illustrated in FIG. 1.

FIG. 2 illustrates portions of an embodiment x-ray inspection system and their use at the inspection sites. In FIG. 2, the mobile conveyance is a cart 204, and the second x-ray scanning module 108 is configured to be mechanically coupled to the cart 204 during the transport 110 and during the irradiation 124 with the second x-ray scanning beam 124. By being mechanically coupled to the cart 204, the second x-ray scanning module 108 may be mounted thereon, set thereon, mounted therein, affixed thereto, etc. The cart 204 is configured to be removable, with the second x-ray scanning module 108, from the vehicle 102 at the inspection site. In particular, in the particular embodiment of FIG. 2, the vehicle 102 includes an optional ramp 254 that can be extended in order to remove the mobile conveyance cart 204 therefrom. The mobile cart may be pushed, or in the case of a motorized cart, controlled to move the second x-ray scanning module 108 to the far side 118 of the object 114, thus positioning the second x-ray scanning module 108 to irradiate the far side 118.

It should be understood that, while the inspection site 112 illustrated in FIG. 1 is not explicitly illustrated in FIGS. 2-9 in all cases, the inspection site will be understood in relation to FIG. 1, where it is shown, and also the object 114 at the inspection site, which is also illustrated.

FIG. 2 also illustrates how the first x-ray scanning module 106 can be configured to be mounted at the vehicle 102 during the transport 110, and also during the radiation of the near side of the object 114 with the first x-ray scanning beam 122. Thus, in this embodiment, the vehicle 102 remains coupled to the first x-ray scanning module 106 both during transport and inspection use.

FIG. 3 illustrates an embodiment system, and its use at the inspection site, wherein the mobile conveyance (cart) 204 is a first mobile conveyance and first cart. The system also includes a second mobile conveyance (cart) 205 that is configured to be mechanically coupled to the vehicle 102 during the transport 110 to the inspection site and to be mechanically decoupled from the vehicle 102 at the inspection site 112. The coupling during the transport is by means of the second mobile conveyance cart 205 being held within, on, secured to, or otherwise mechanically coupled to the vehicle 102 for the transport 110. The decoupling of the second mobile conveyance cart may be by any means used for the first mobile conveyance cart, such as means that have been described. While not shown in FIG. 3, the decoupling in this embodiment may be by means of a ramp, such as the ramp 254 in FIG. 2.

The first x-ray scanning module 106 is configured to be movable and position at the inspection site 112 via the second mobile conveyance cart 205. While not illustrated on the right of FIG. 3, the vehicle 102 may remain present at the inspection site and may be used for other purposes in various embodiments, as will be illustrated and described in connection with FIGS. 10A-16.

Figure 4:
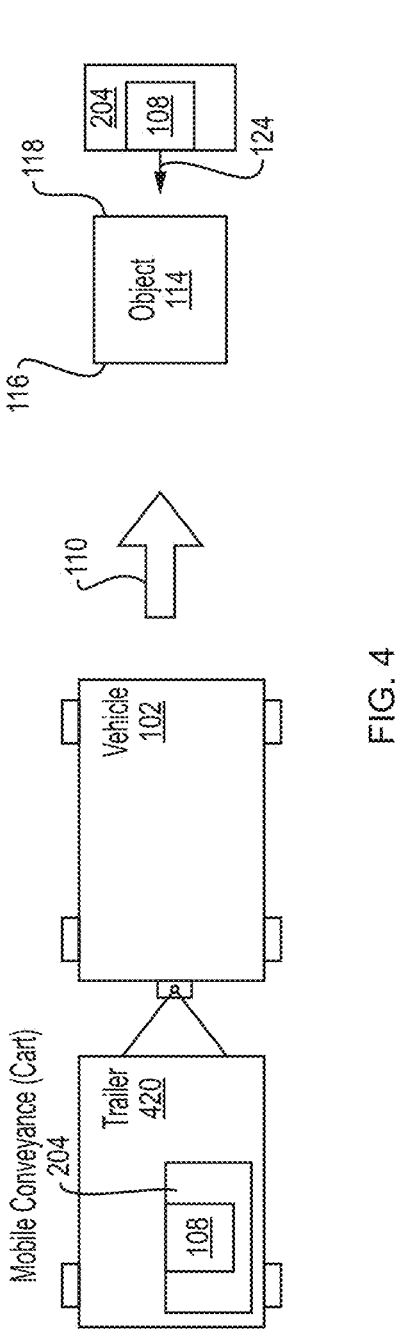
FIG. 4 is a schematic diagram illustrating components of an embodiment x-ray inspection system including a trailer and a mobile conveyance coupled to the trailer for transport, as well as a use of system components at the inspection site.

FIG. 4 illustrates portions of an embodiment system that also includes a trailer 420 that is configured to be pulled by the vehicle 102 during the transport 110. In this embodiment, the mobile conveyance cart 204 is configured to be secured at the trailer 420 during the transport 110 and to be removable from the trailer at the inspection site. Where the mobile conveyance is secured at the trailer, it may be mounted thereto, held therein, and the like, such as by straps, brackets, bolts, by having wheel locks on the cart 204, or any other means of securing the mobile conveyance cart 204 during the transport sufficiently such that the scanning module and cart components are not damaged. Removal of the cart 204 from the trailer 420 may be by any means described in connection with removal of a mobile conveyance from the vehicle 102, such as by ramp, manual lifting, a robotic mechanism, etc.

Figures 6, 7:
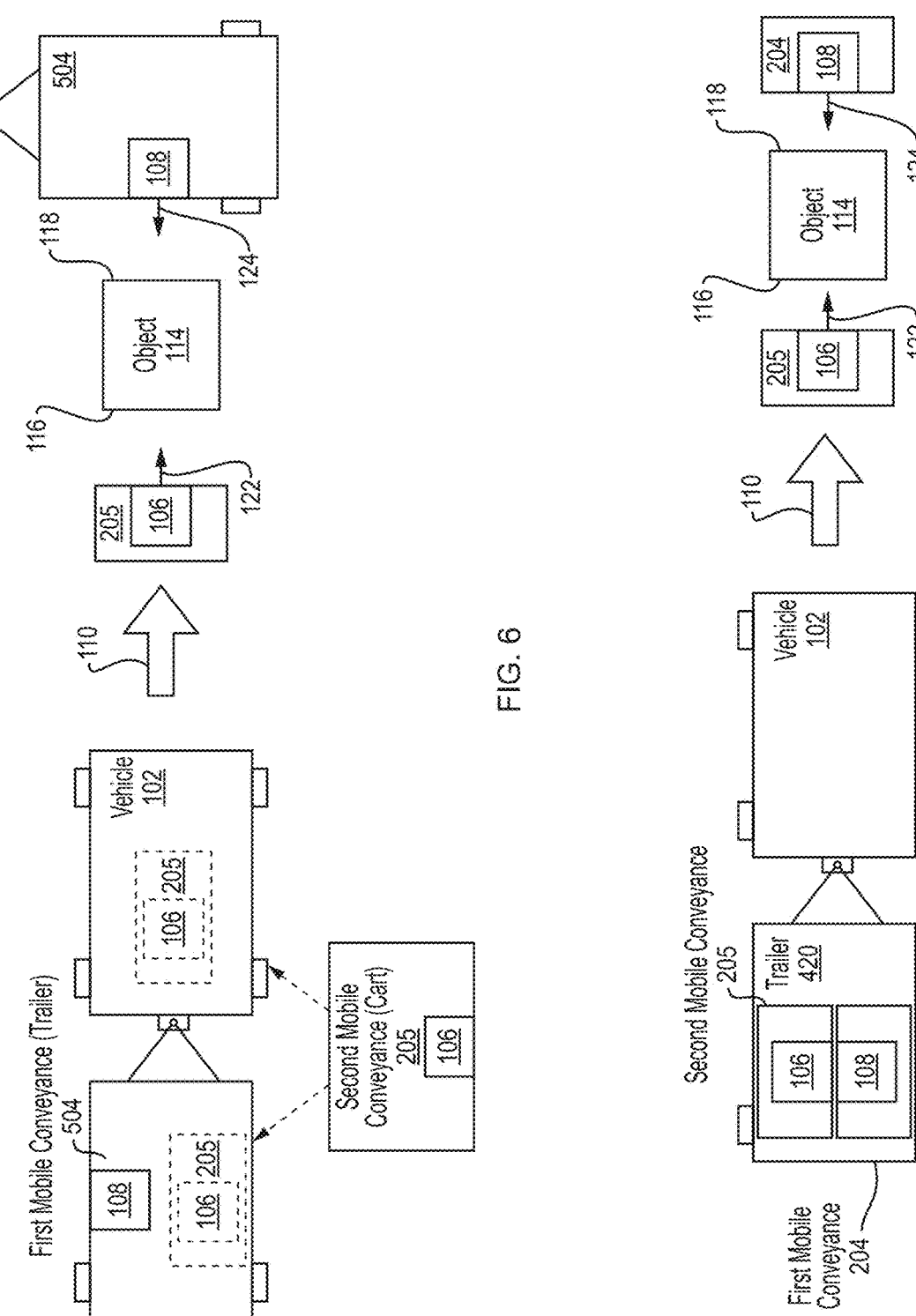
FIG. 6 is a schematic diagram illustrating components of an embodiment x-ray inspection system including a trailer serving as the first mobile conveyance, and also including a second mobile conveyance that may be transported coupled to the vehicle or to the trailer.
FIG. 7 is a schematic diagram illustrating components of an embodiment x-ray inspection system having a trailer configured to carry two mobile conveyances to the inspection site.

While not illustrated in FIG. 4, it will be understood that a full embodiment system includes the first x-ray scanning module 106, whether mounted to the vehicle 102 or trailer 420 for both transport and scanning, or whether by mounting the first x-ray scanning module to a second mobile conveyance, as illustrated in FIG. 3, 6, or 7, for example.

Figure 5:
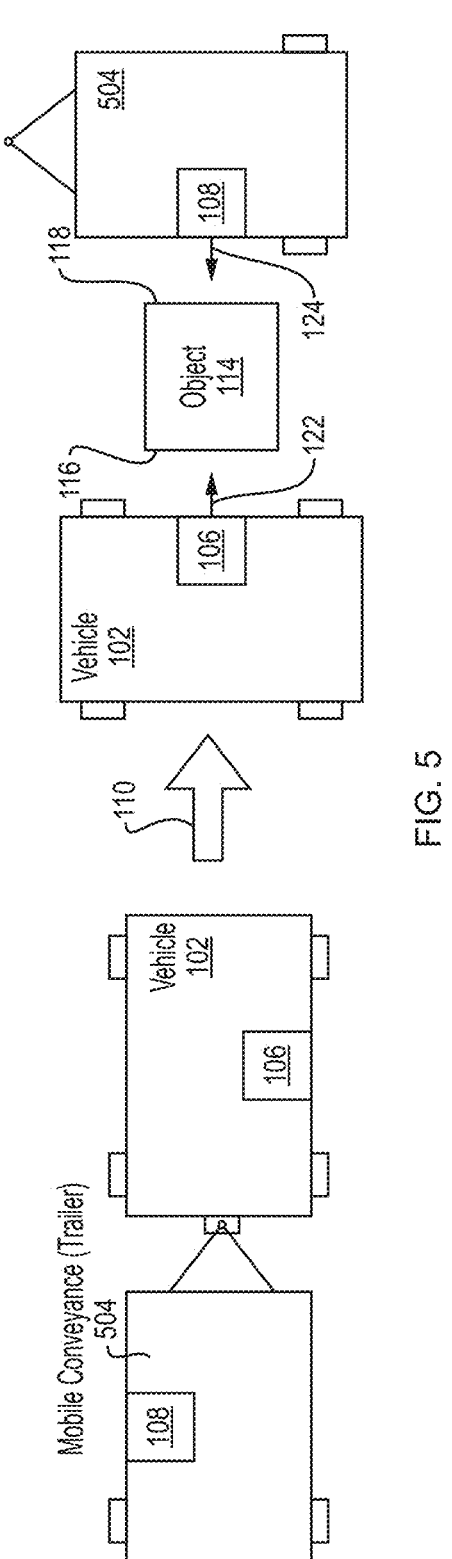
FIG. 5 is a schematic diagram illustrating components of an embodiment x-ray inspection system in which a trailer is the mobile conveyance, as well as use of system components at the inspection site.

FIG. 5 illustrates an embodiment x-ray inspection system both during transport and in use for scanning at the inspection site. In the embodiment of FIG. 5, the trailer is considered to be the mobile conveyance, particularly a mobile conveyance (trailer) 504. The trailer 504 is configured to be pulled by the vehicle 102 during the transport 110. The second x-ray scanning module 108 is configured to be mechanically coupled to the trailer 504 both during the transport 110 and during the irradiation with the second x-ray scanning beam 124. The first x-ray scanning module 106 is configured to be mounted at the vehicle both during the transport 110 and during the irradiation with the first x-ray scanning beam 122. Thus, at the inspection site, the vehicle 102 may tow the trailer 504 to the appropriate position, unhitch the trailer as a decoupling, and then the vehicle 102 can move itself to the near side of the object 114 to begin scanning, while the trailer 504 remains at the far side. In that manner, the second x-ray scanning module 108 is configured to be movable and positioned, via the trailer 504, at the inspection site, via the vehicle initially moving the trailer 504.

As described hereinafter in connection with FIGS. 10A-16, and while not illustrated in FIG. 5, the beams 122 and 124 may be offset from one another in a direction of translation of the object 114, in order to avoid detecting transmitted beams at backscatter detectors. As another option, the beams 122 and 124 may be temporally interleaved to avoid this issue.

FIG. 6 illustrates a further embodiment x-ray scanning system in which a trailer 504 is considered the mobile conveyance, particularly a first mobile conveyance (trailer) 504. Being considered the first mobile conveyance, the second x-ray scanning module 108 is configured to be mounted at the trailer and mechanically coupled to the trailer both for the transport to the inspection site and for the radiation with the second x-ray scanning beam 124 during the scanning inspection process. In addition, in this embodiment, there is a second mobile conveyance (cart) 205, which may be mechanically coupled either to the trailer 504, or to the vehicle 102, during the transport 110. These two options are indicated by dashed arrows and dashed outlines for the second mobile conveyance cart 205 in the trailer 504 and vehicle 102. In all cases, the second mobile conveyance (cart) 205 is configured to have the first x-ray scanning module 106 coupled thereto during the transport and during the irradiation with the first x-ray scanning beam, and the cart 205 is configured to be mechanically decoupled from either the vehicle or from a trailer, at the inspection site, for the scanning with the first beam 122. The vehicle 102 is not illustrated at the inspection site, although it may be present, because it is not necessary for an understanding of the embodiment. Other uses of the vehicle 102 at the inspection site are illustrated in FIGS. 10A-16, for example.

FIG. 7 illustrates an embodiment system having first and second mobile conveyances 204 and 205, respectively, and which includes a separate trailer 420 that is not considered to be a mobile conveyance for purposes of the claimed subject matter. The first x-ray scanning module 106 is coupled to the second mobile conveyance 205, and the second x-ray scanning module 108 is mechanically coupled to the first mobile conveyance 204, both for the transport 110 and also for the scanning with the first and second x-ray scanning beams 122 and 124, respectively. As in other embodiments, the trailer 420 is configured to be towed by the vehicle 102 for the transport to the inspection site.

Further in FIG. 7, the first x-ray scanning module 106 is configured to be movable and positioned, via the second mobile conveyance 205, to irradiate, with the first x-ray scanning beam 122, the near side 116 of the object 114 to be inspected. The first and second mobile conveyances 204 and 205, respectively, are both configured to be mechanically coupled to the trailer 420 during the transport 110 to the inspection site and to be mechanically decoupled from the trailer 420, with the second and first x-ray scanning modules 108 and 106 remaining coupled thereto, respectively, at the inspection site, for the irradiation with the second and first x-ray scanning beams, respectively. For the embodiment of FIG. 7, as in some previously described embodiments, it is not needful to illustrate the vehicle 102 or the trailer 420 at the inspection site, although these may be present and useful, as will be illustrated in reference to the other drawings to be described.

Figure 8:
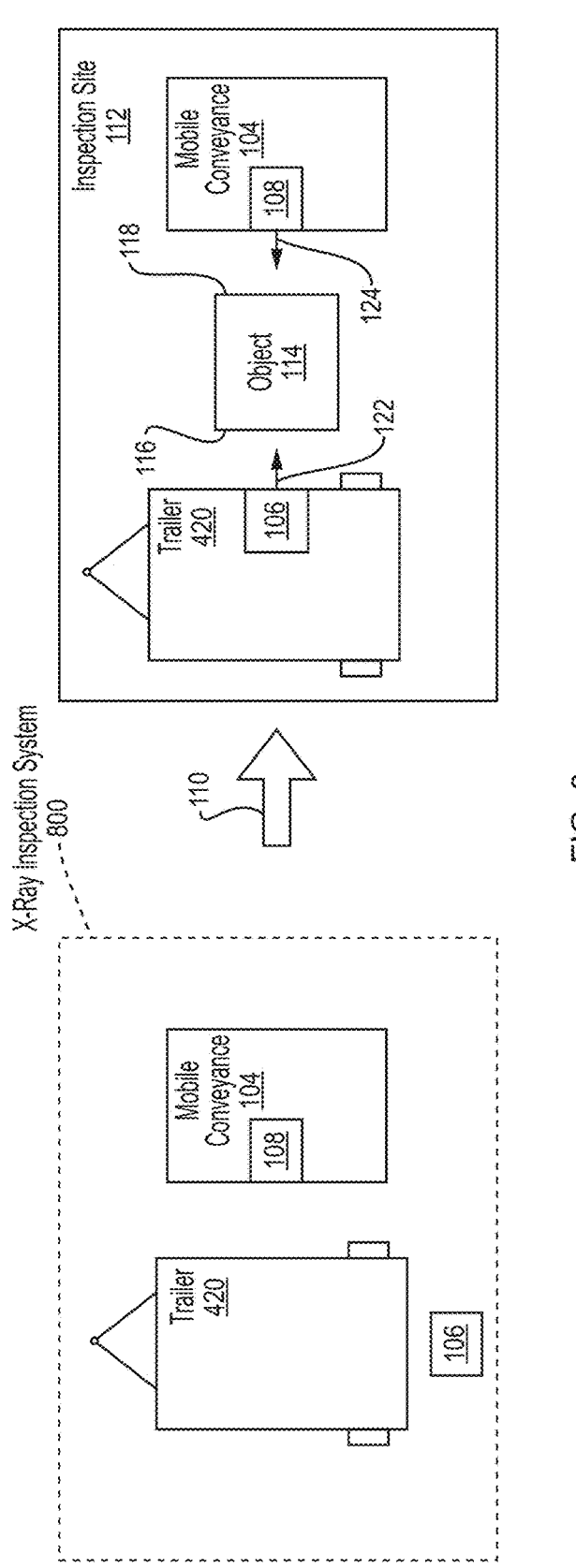
FIG. 8 is a schematic diagram illustrating an embodiment x-ray inspection system that includes a trailer without a vehicle, as well as a use of the system at the inspection site.

FIG. 8 is a schematic diagram of a most generalized embodiment x-ray inspection system 800 that includes a trailer, but not a vehicle, as in the FIG. 1 embodiment. Nonetheless, the trailer 420 is configured to be towed by a vehicle to the inspection site 112. The system 800 also includes the first x-ray scanning module 106 and the second x-ray scanning module 108. In this embodiment, the first x-ray scanning module 106 is configured to be transportable, via the trailer 420, to the inspection site 112. In other respects, the first x-ray scanning module is similar to that described previously in connection with FIGS. 1-7. Namely, the module 106 is configured to irradiate, with the first x-ray scanning beam 122, the near side 116 of the object to be inspected at the inspection site.

The mobile conveyance 104 is configured to be mechanically coupled to the trailer 420 during the transport to the inspection site and to be mechanically decoupled from the trailer, with the second x-ray scanning module, at the inspection site. The second x-ray scanning module 108 is configured to be movable via the mobile conveyance 104 and to be positioned, via the mobile conveyance, to irradiate, with the second x-ray scanning beam 124, the far side 118 of the object 114 to be inspected.

The first x-ray scanning module 106 is configured to be mechanically coupled to the trailer 420, both during the transport to the inspection site 112, as well as during the irradiation of the near side 116 of the object with the first x-ray scanning beam 122. Accordingly, in the embodiment illustrated on the right of FIG. 8, the trailer is positioned at the near side of the target object 114 for backscatter x-ray inspection, while the mobile conveyance is used to position the second x-ray scanning module 108 at the far side 118.

Figure 9:
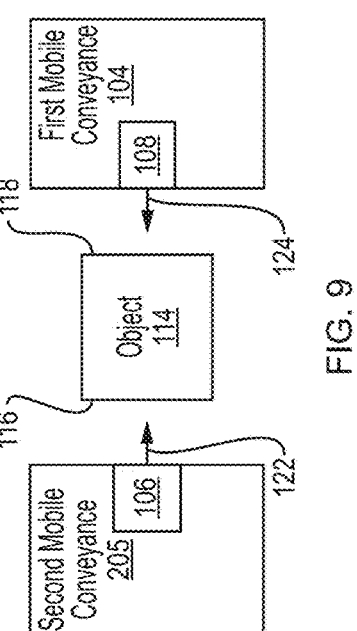
FIG. 9 is a schematic diagram illustrating an alternative use of components of the system of FIG. 8 at the inspection site.

Particular embodiment arrangements and configurations encompassed within the embodiment system 800 may be understood by reference to FIG. 6 (leftmost option) and FIG. 7, as well as FIG. 9.

FIG. 9 shows an arrangement of the elements of FIG. 8 in which an embodiment system additionally includes the second mobile conveyance 205. Both mobile conveyances 104 and 205 are configured to be mechanically coupled to the trailer 420 during the transport, much like the conveyances 204 and 205 in FIG. 7. Both the first and second mobile conveyances 104 and 205, respectively, are configured to be mechanically decoupled from the trailer at the inspection site. The first x-ray scanning module 106 is configured to be movable and positioned, via the second mobile conveyance 205, to irradiate, with the first x-ray scanning beam 122, the near side 116 of the object be inspected.

FIGS. 10A-16 are various top-view, side-view, and perspective-view drawings illustrating more particular implementations of various embodiments described hereinabove, as well as additional embodiments with particular desirable features. It should be understood that features described in connection with FIGS. 10A-16 may be included in any of the embodiments described in connection with FIGS. 1-9. Furthermore, it should be understood that any of the features described in connection with FIGS. 1-9 may be included in the embodiments described in connection with FIGS. 10A-16. Moreover, the features and modes of operation of particular embodiments described in connection with FIGS. 10A-16, relative to the claims that follow hereinafter, may be readily understood by reference to features having similar names in FIGS. 1-9.

Figure 10B:
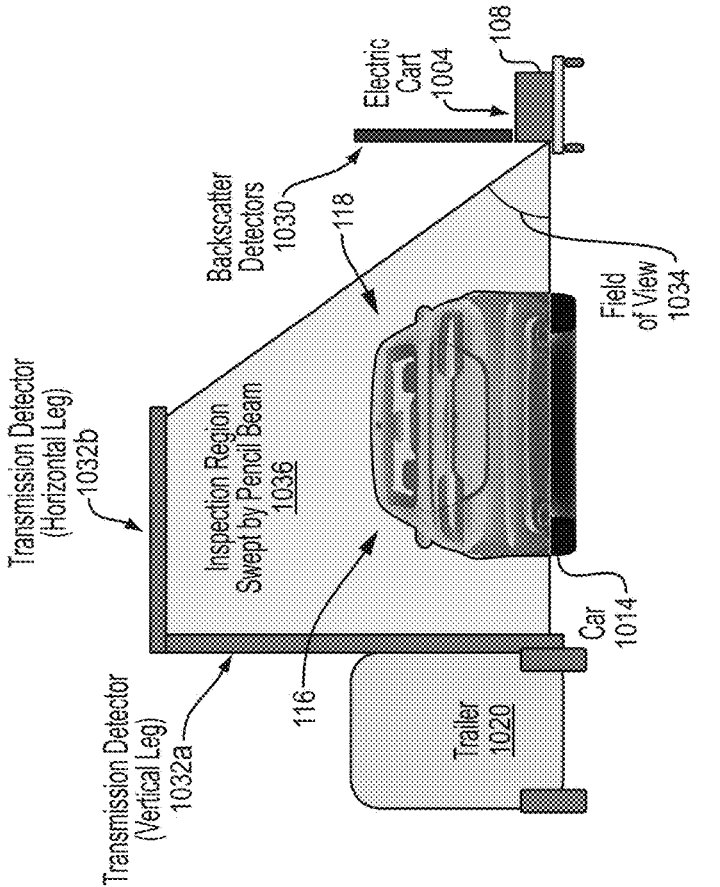
FIG. 10B is a side-view illustration of the embodiment system of FIG. 10A.
Figure 10A:
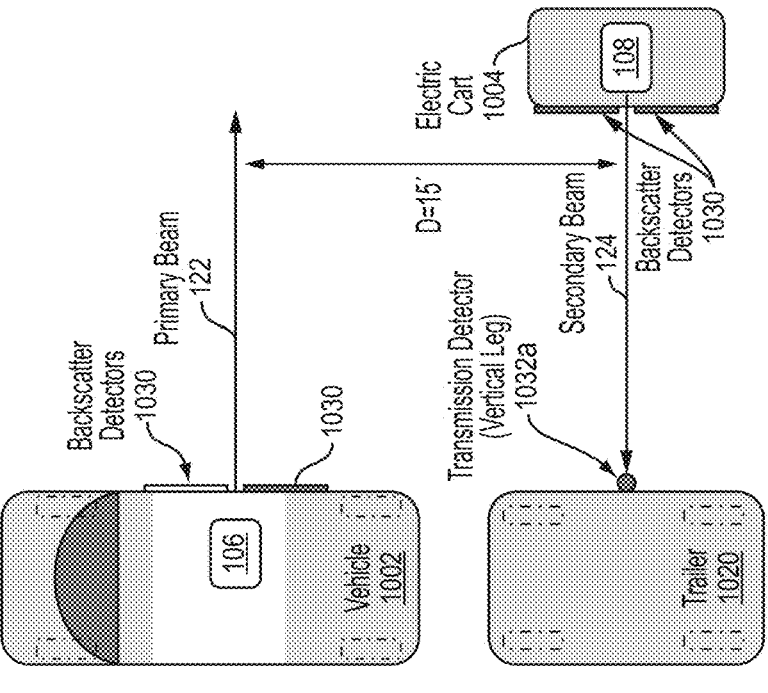
FIG. 10A is a top-view diagram illustrating an embodiment x-ray inspection system having non-interleaved x-ray scanning beams produced by respective x-ray scanning modules, using a cart mounted second x-ray scanning module and an optional trailer mounted transmission detector.

FIG. 10A is a top-view diagram illustrating an embodiment x-ray inspection system having non-interleaved x-ray scanning beams produced by respective x-ray scanning modules, using a cart-mounted second x-ray scanning module and an optional trailer mounted transmission detector.

FIG. 10B is a side-view illustration of the embodiment system 1000 of FIG. 10A. A system vehicle 1002 includes, coupled thereto for purposes of transport and for purposes of scanning inspection, the first x-ray scanning module 106. The first x-ray scanning module 106 and associated backscattered detectors 1030, which are mounted to the vehicle 1002, are used to acquire images of the near side 116 of an inspected vehicle or other object, and in particular used for a car 1014 in the illustration. Both the first x-ray scanning module 106 and the associated backscatter detectors 1030 are mounted on the main motorized vehicle 1002, which is preferably a van or small truck. The second x-ray scanning module 108 and its associated backscatter detectors 1030 are mounted on a small electric motorized cart 1004. In other embodiments, a cart used for this purpose is not motorized.

The cart 1004 is positioned so that it can acquire backscatter images of the far side 118 of the car 1014. The cart 1004 can include its own power module for x-ray scanning, such as rechargeable lithium-ion batteries, or it can receive external power from the vehicle 1002, such as via an electric cable (not shown in FIG. 10A) in order to power its systems or to keep its batteries charged. The cart 1004 with its x-ray scanning module 108 and detectors 1030 can be stowed and transported to the inspection site (the environment shown both in FIGS. 10A and 10B) in a trailer 1020, which is towed behind the vehicle 1002. In other embodiments, the cart 1004 can be stowed in the rear of the vehicle 1002. A deployable ramp, such as the ramp 254 in FIG. 2, can be used to facilitate entry and removal of the cart from the trailer or vehicle. This entry and removal can also be referred to herein as coupling and decoupling, respectively, of the cart to or from the vehicle or trailer.

The cart 1004 can be positioned relative to the main vehicle (system vehicle) 1002 so that the planes containing the primary beam 122 (also referred to herein as a first x-ray scanning beam) and the secondary beam 124 (also referred to herein as a second x-ray scanning beam) are separated by enough distance so that there is no discernible cross talk between the two imaging systems, even when there is no temporal interleaving of the x-ray beams 122 and 124 (i.e. the beams are energized simultaneously). This has the advantage that twice as many lines of image data can be acquired during the time it takes for the inspected vehicle 1014 to pass through the system, compared with a temporally interleaved system, wherein only one beam can be turned on at any given instance. A temporally interleaved system results in half the image resolution in the drive direction of the inspected vehicle 1014.

In FIGS. 10A-10B, the beam plane separation distance is shown as D=15 feet, but larger or smaller distances D can be chosen, depending on the space available. The preferred embodiment illustrated in FIGS. 10A-10B also enables transmission images to be optionally acquired simultaneously with the acquisition of backscatter images with the second x-ray scanning module 108. A transmission detector 1032a mounted on the trailer 1020 intercepts the beam 124 from the second x-ray scanning module 108 that is transmitted through the inspected vehicle 1014. The transmission detector can include a single, very tall, vertical leg alone, the vertical leg 1032a. Alternatively, the transmission detector can include an L-shaped detector as shown, which is shorter in height, but still intercepts the beam over the full extent of its sweep. The L-shaped detector illustrated in FIGS. 10A-10B includes a transmission detector vertical leg 1032a and the horizontal leg 1032b.

The transmission detector 1032a-b can be a single-energy detector, or it can be a dual-energy detector that provides a colorized transmission image providing material discrimination capability. The transmission detector can be designed to fold up or to be easily disassembled, such that it can be conveniently stowed inside the trailer 1020 or within the main vehicle 1002, during transport. The main vehicle 1002 can also be used to provide command and control functions, provide auxiliary power to the imaging subsystems, and to provide space for operators to perform image analysis.

In order to understand the function of the system more fully, including terminology used in the application, it is noted that the second x-ray scanning module 108 scans the beam 124 nominally in a vertical plane, with a field of view 1034. This results in an inspection region 1036 that is swept by the scanning pencil beam 124.

Figure 11:
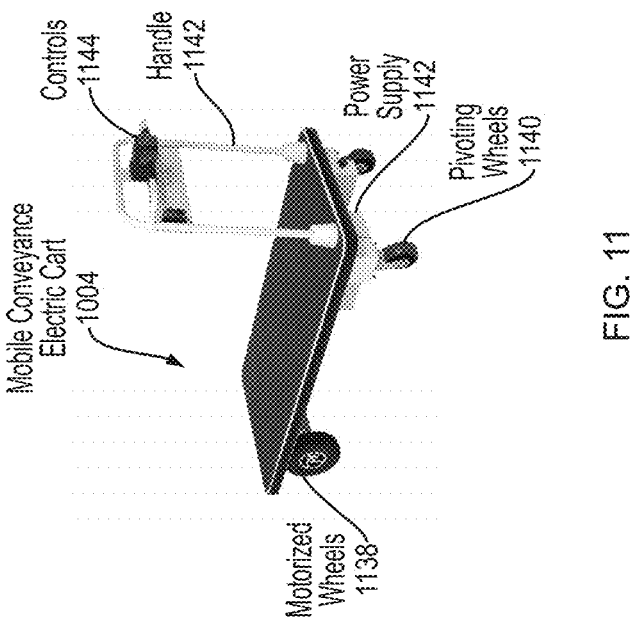
FIG. 11 is an illustration of an electric cart that can be used to support the second x-ray scanning module and associated backscatter detectors of the embodiment of FIGS. 10A-10B and other embodiments.

FIG. 11 is a perspective view illustration of the electric carts 1004 used in the embodiment of FIGS. 10A-10B. The electric cart 1004 has two primary advantages over other embodiment carts. First, the use of the small cart for the second x-ray scanning module reduces the overall width of the imaging system. For example, a small electric cart such as that shown in FIG. 11 is sufficient to support the second x-ray scanning module 108, detectors 1030, and any peripheral subsystems that may be included. Yet the electric cart 1004 has a width of only 30 inches, or 2.5 feet.

Second, the relatively low height of the electric cart 1004 allows the second x-ray scanning module to be positioned close to the ground, which can be advantageous for providing full coverage of the inspected vehicle if transmission images are also acquired. With this geometry, almost complete coverage of the inspected vehicle 1014 can be obtained in the transmission image without requiring any transmission detector to be positioned under the inspected vehicle. For example, the embodiment shown in FIGS. 10A-10B provides full transmission imaging coverage of the inspected car 1014, except for the lowest regions of the tires. If the x-ray scanning module were to be positioned higher from the ground, a horizontal leg of the transmission detector would need to be placed under the inspected vehicle to get similar coverage. This would require a ramp structure to house the detector over which the vehicle would have to pass, adding complexity and the additional requirement to keep the ramp anchored firmly on the roadway to prevent any movement and resulting potential loss of alignment of the detector with the incident beam.

The electric cart 1004 can have various optional features including motorized wheels 1138, pivoting wheels 1140, an onboard power supply 1146 as previously noted, a handle 1142 for an operator to assist in directing the cart, and controls 1144. However, even without motorized wheels, a human operator can move and position the cart at the proper location at the inspection site to achieve its function.

Figures 12A, 12B:
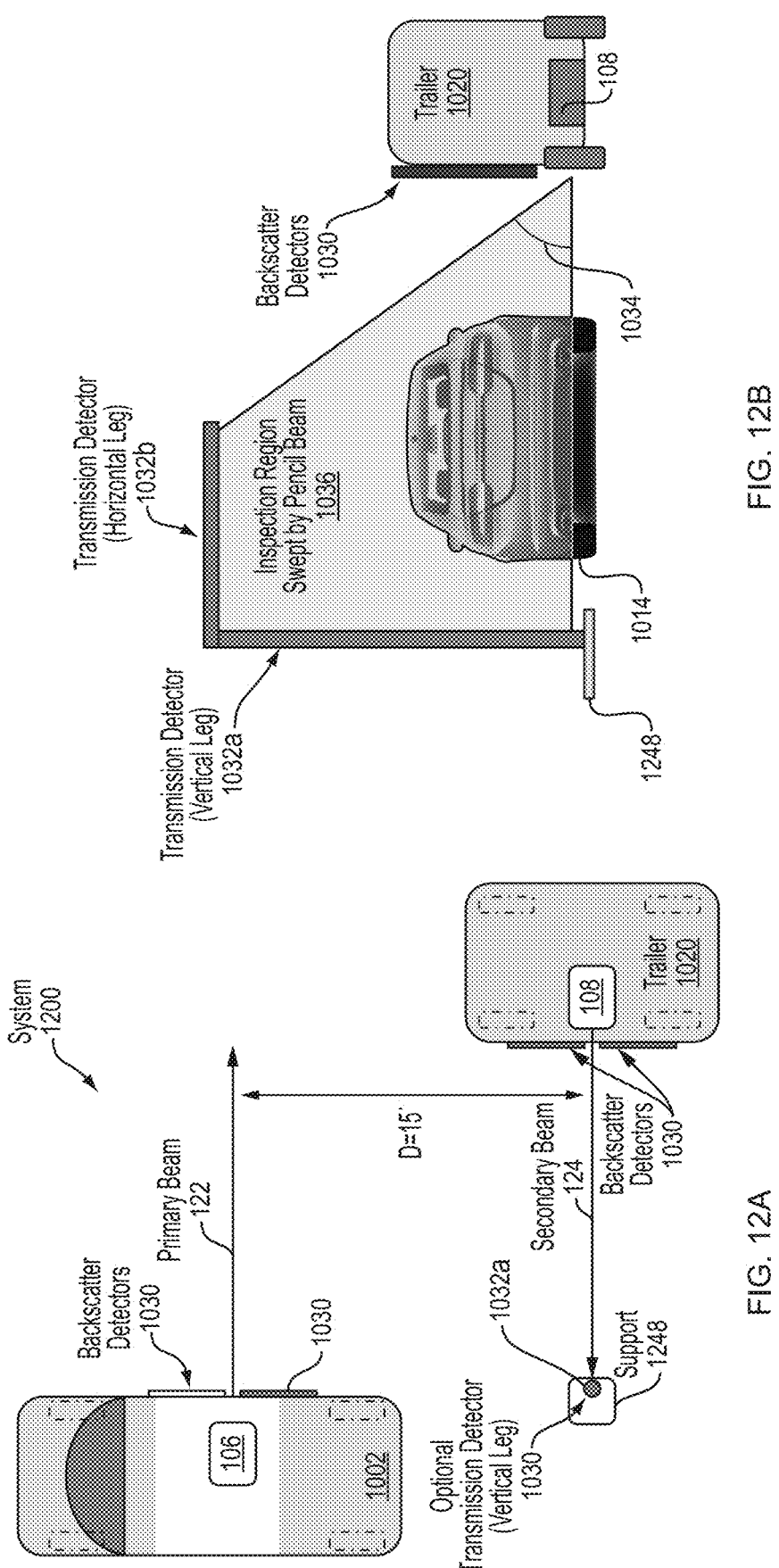
FIGS. 12A-12B are top-view and side-view illustrations, respectively, of an embodiment x-ray inspection system using non-interleaved x-ray scanning beams, a trailer-mounted second x-ray scanning module, and an optional standalone transmission detector.

A second embodiment system 1200 is illustrated in FIGS. 12A-12B. The system 1200 is similar to the system 1000 of FIGS. 10A-10B, except that the trailer 1020 towed behind the motorized vehicle 1002 contains the second x-ray scanning module 108 and the associated backscatter detectors 1030 are mounted thereon. In the system 1200 embodiment, a large enough distance between the beam planes for the beams 122 and 124 is maintained so that no temporal interleaving of the x-ray scanning modules 106, 108 is required. A standalone detector 1032a, supported on a support 1248, is used to intercept the second x-ray scanning beam 124 from the second x-ray scanning module 108 to create a transmission image. Because the second x-ray scanning module 108 is mounted within the trailer 1020, the scanning module is further from the ground compared with the embodiment system 1000. This means that without the use of a detector leg below the inspected vehicle 1014, the transmission image cuts off more of the inspected vehicle 1014 compared with the system 1000. A further disadvantage of the embodiment system 1200 is that the total width of the inspection system is greater, due to increased width of the trailer 1020, compared with the cart 1004 of the system 1000.

In view of the description and examples above in relation to FIGS. 10A-10B and 12A-12B, for example, it will be readily understood that embodiment systems can include a transmission detector that is configured to detect x-rays from either the first or the second x-ray scanning beam that are transmitted through the object that is being inspected. It will be further understood that the transmission detector can be mounted to a trailer, such as illustrated in FIGS. 10A-10B, that is configured to be towed by a vehicle during the transport. Furthermore, as illustrated hereinafter in connection with FIGS. 13A-13A, a transmission detector may be mounted to the vehicle 1002. Furthermore, it will be understood that the transmission detector can be a dual-energy detector, consistent with the description given above and the knowledge available to those of ordinary skill in the art of dual-energy x-ray detectors. It will further be understood that the transmission detector 1032a, 1032b, for example, can be configured to be stowed, during the transport of the system, in the vehicle 1002 or in the trailer 1020 that is configured to be towed by the vehicle during the transport.

Figures 13A, 13B:
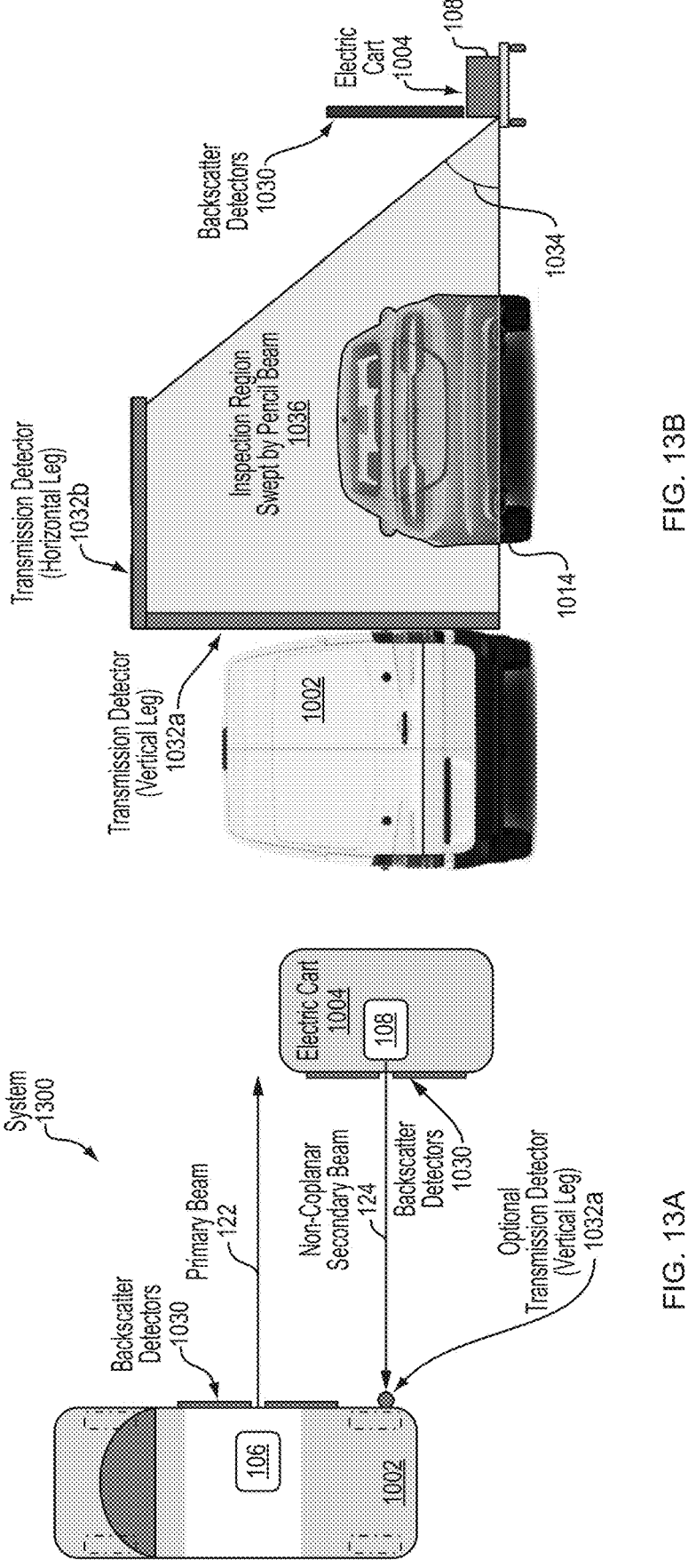
FIGS. 13A-13B are top-view and side-view illustrations, respectively, of an embodiment x-ray inspection system with optionally temporally interleaved x-ray scanning beams, a cart-mounted second x-ray scanning module, and an optional transmission detector mounted on the vehicle.

FIGS. 13A-13B are top-view and side-view illustrations of still another embodiment system 1300. The embodiment system 1300 is particularly useful when space at an inspection site is limited. The system 1300 uses the electric cart 1004 to support the second x-ray scanning module 108 and its associated backscatter detectors 1030. However, the optional transmission detector 1032a, 1032b is mounted on the main vehicle 1002, rather than on a trailer towed behind the vehicle 1002. Because the separation of the primary and secondary beam planes for the scanning beams 122, 124, which are perpendicular to the plane of the page, is substantially smaller than 15 feet, the two x-ray scanning modules 106, 108 must usually be temporally interleaved in order to reduce crosstalk between the two backscatter images produced thereby. As previously described, this reduces the image resolution along the drive direction of the car 1014 by a factor of two, compared with a preferred embodiment.

Further described in FIGS. 13A-13B, the cart 1004 and its associated x-ray backscatter detectors 1030 and scanning module 108 can be stored inside the back of the vehicle 1002 for transport. Alternatively, optionally, the cart, scanning module, and detectors can be stored inside the back of a trailer towed behind the vehicle 1002 (not illustrated in FIG. 13A-13B). As in the embodiment systems 1000 and 1200, the transmission detector 1032a, 1032b in the system 1300 can be folded or disassembled so that it can be conveniently stowed in the system vehicle 1002 or a trailer pulled by the vehicle.

As with the embodiment system 1000, the embodiment system 1300 has an advantage that the second x-ray scanning module 108 can be positioned close to the ground, allowing almost full coverage of the inspected vehicle 1014 in a transmission image, without requiring a horizontal detector leg to be positioned below the inspected vehicle.

Figures 14A, 14B:
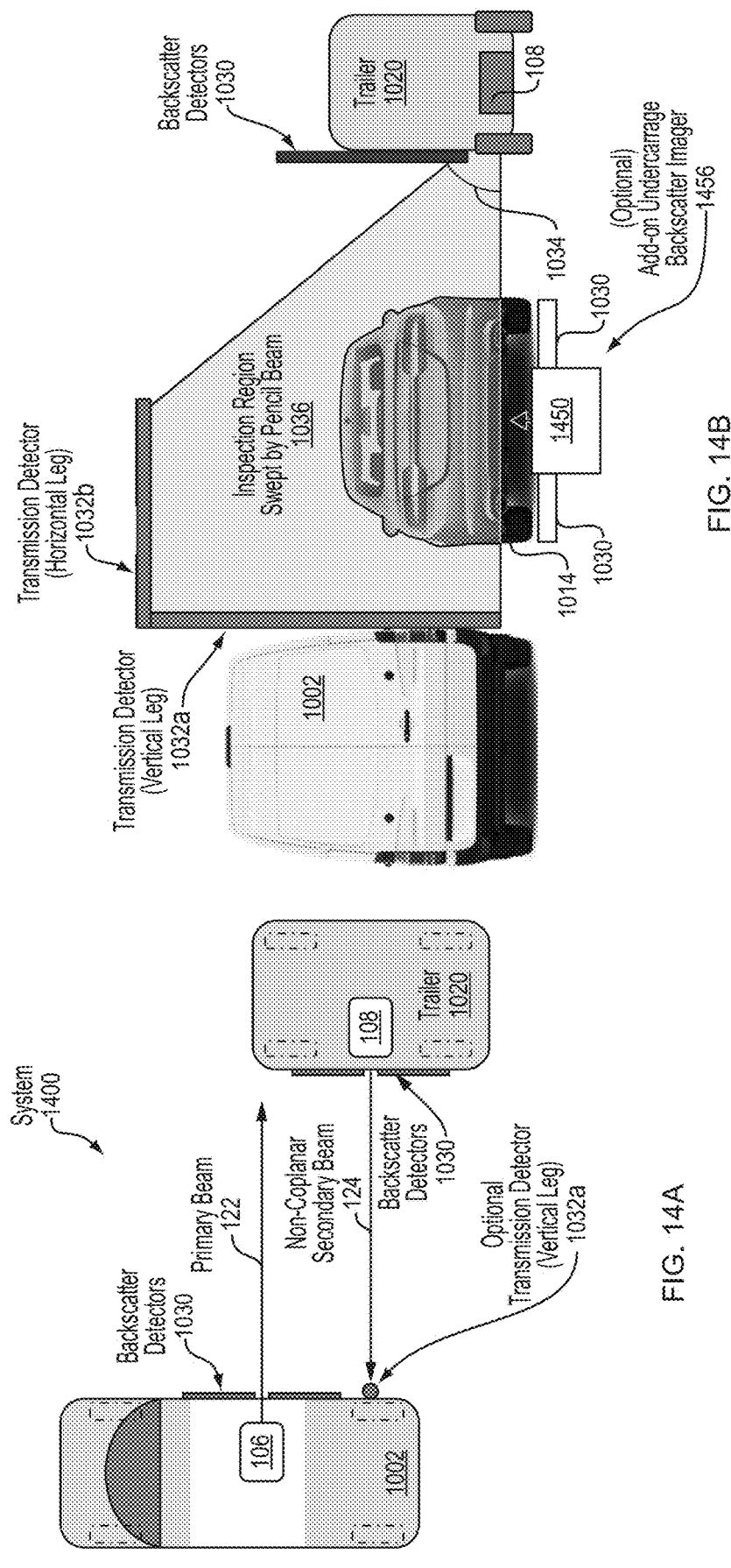
FIGS. 14A-14B are top-view and side-view illustrations, respectively, of an embodiment x-ray inspection system utilizing optionally temporally interleaved x-ray scanning beams, a trailer-mounted second x-ray scanning module, and an optional transmission detector mounted on the vehicle.

FIGS. 14A-14B are top-view and side-view illustrations, respectively, of an embodiment system 1400 in use at an inspection site. The system 1400 is also advantageous where space is more limited. This embodiment uses the trailer 1020 as a support for the second x-ray scanning module 108 and its associated backscatter detectors 1030, which are mounted thereto. The optional transmission detector 1032a, 1032b is mounted on the main system vehicle 1002. Because the separation of the primary and secondary beam planes is substantially smaller than 15 feet, the two x-ray scanning modules 106 and 108 are preferably temporally interleaved to reduce crosstalk between the two backscatter images resulting therefrom. As previously described, this reduces the image resolution along the drive direction by a factor of two, compared with a preferred embodiment. As in the other embodiments, the transmission detector can be folded or disassembled so that it can be conveniently stowed in the vehicle or trailer.

The second x-ray backscatter scanning module 108 is configured to sit low in the trailer 1020, thus reducing any need for undercarriage backscatter scanning, as already described. Nonetheless, an optional add-on undercarriage backscatter imager 1456 is illustrated for clear understanding of the scope of options for embodiment systems. A third x-ray scanning module 1450, and associated backscatter detectors 1030, are configured to be transported to the inspection site by the vehicle 1002 or by the trailer 1020 towed by the vehicle, during the transport. The third x-ray scanning module 1450 is configured to be positioned at the underside of the object to be scanned, in this case the car 1014, and to output a third x-ray scanning beam 1452 toward the underside of the vehicle. In reference to this description, as well as features known to those of skill in the art of x-ray backscatter imaging, it will be understood that a third x-ray backscatter scanning module may be implemented in embodiment systems. For example, the third scanning module 1450 can be placed within a ramp over which the car 1014 drives, or can be embedded within a trench over which the car 1014 drives, for example.

Figure 15:
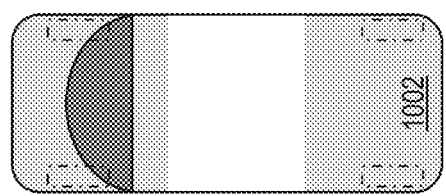
FIG. 15 is a top-view diagram of an embodiment x-ray inspection system utilizing non-interleaved x-ray scanning beams, cart-mounted first and second x-ray scanning modules, and an optional transmission detector mounted on a third cart.
Figure 15:
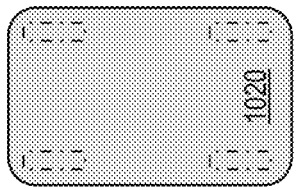
Figure 15:
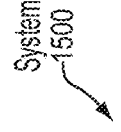
Figure 15:
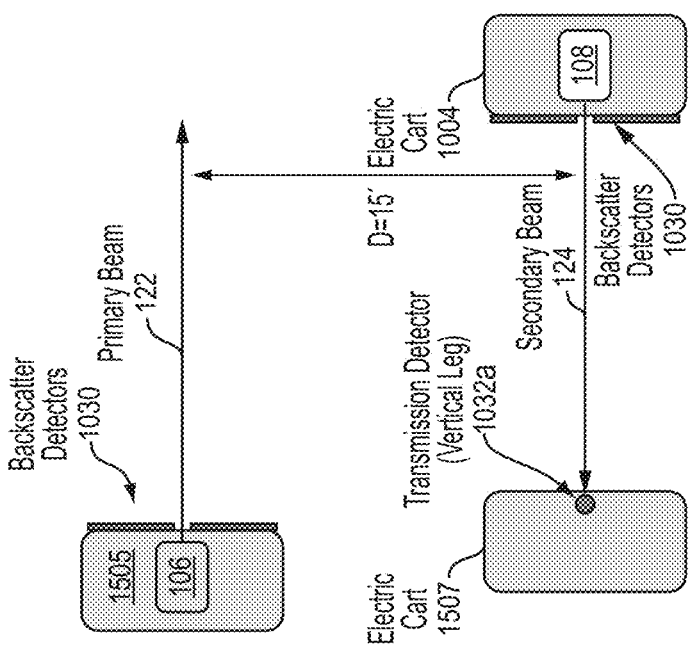

FIG. 15 is a top-view illustration of an embodiment system 1500 in use at an inspection site. The system 1500 can be advantageously used where the space at an inspection site is very limited. For example, this type of limited space may apply in an inspection space that includes a location for the system 1500 between lanes of cars, where there might be only a few feet of space available for each half of the imaging system to be positioned. In the system 1500, the first and second x-ray scanning modules and their associated backscatter detectors 1030 are each mounted on carts 1505, 1004, respectively, or some other man-portable platform. The optional transmission detector 1032*a* can also be mounted on a cart 1507 to keep the footprint to a minimum. The main system vehicle 1002 is used primarily to provide command and control functions, provide auxiliary power to the imaging systems subsystems, and to provide space for operators to perform image analysis. Cables, such as electric supply cables or signal cables, while not illustrated in FIG. 15, can be used between the various electric carts and the system vehicle 1002 or system trailer 1020 as needed.

Figure 16:
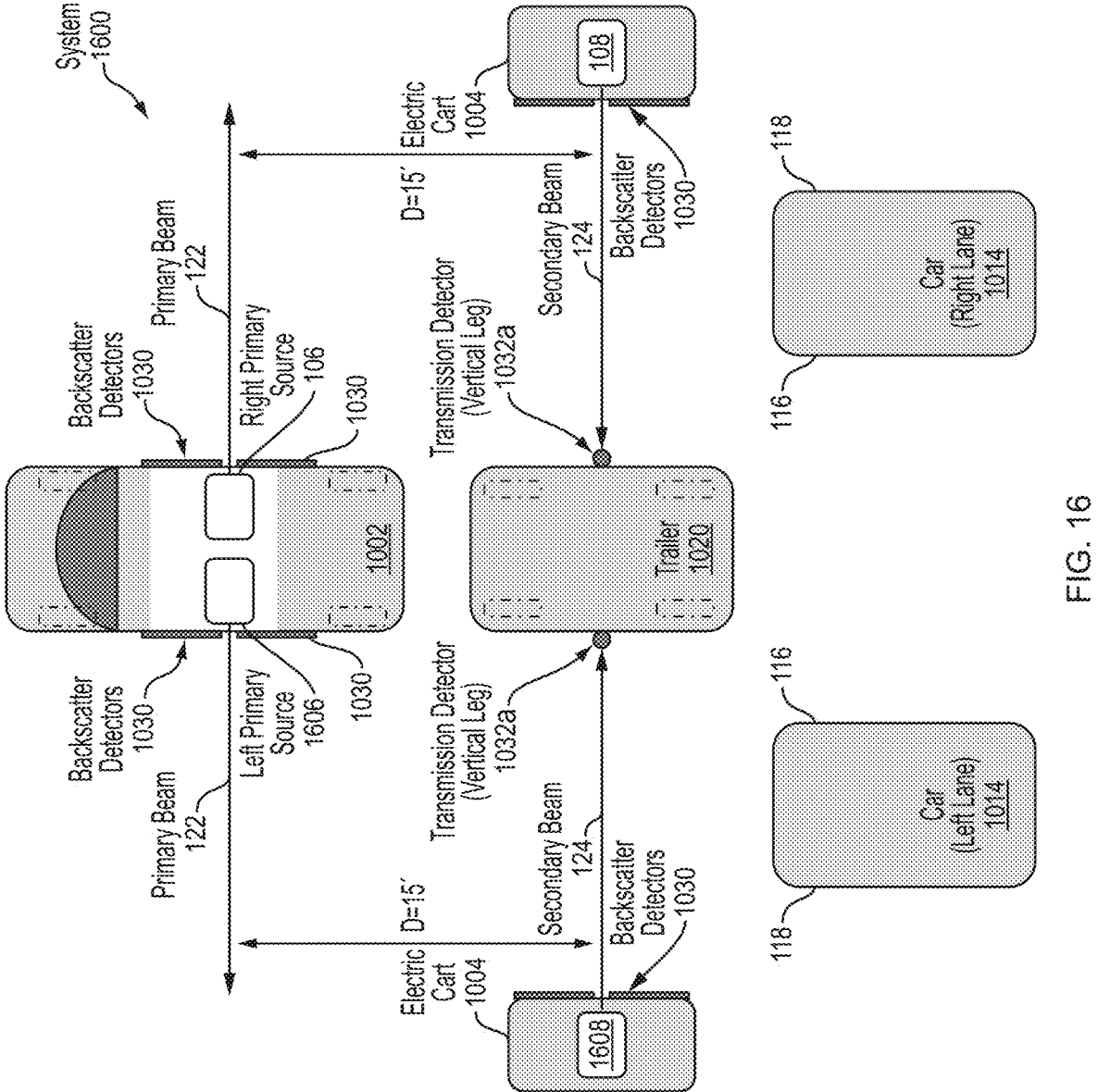
FIG. 16 is a top-view diagram of an embodiment x-ray inspection system configured to scan two adjacent lanes of vehicles simultaneously using non-interleaved x-ray scanning beams, vehicle-mounted first x-ray scanning modules, and cart-mounted second x-ray scanning module, along with optional transmission detectors mounted on a trailer.

FIG. 16 is a top-view diagram illustrating an embodiment x-ray inspection system 1600 in use at an inspection site. The system 1600 can be particularly advantageously used to scan vehicles 1014 that are passing the system 1600 in two adjacent lanes. In the system 1600, the main system vehicle 1002 contains two primary (first) x-ray scanning modules 106 and 1606. Also mounted to the respective sides of the vehicle 1002 are the associated backscatter detectors 1030 for the right and left lanes.

Also in system 1600, corresponding right and left secondary x-ray scanning modules 108, 1608 and their associated backscatter detectors 1030 for the right and left lanes, respectively, are mounted on two separate electric carts 1004. In alternative embodiments, the modules 108 and 1608 may be mounted on some other human-movable platform. Optional transmission detectors 1032*a* can be mounted either on the trailer 1020, which is towed by the vehicle 1002 (ideally for non-interleaved x-ray scanning beams) or on the vehicle 1002 itself (for example, for interleaved x-ray scanning beams).

Figure 17:
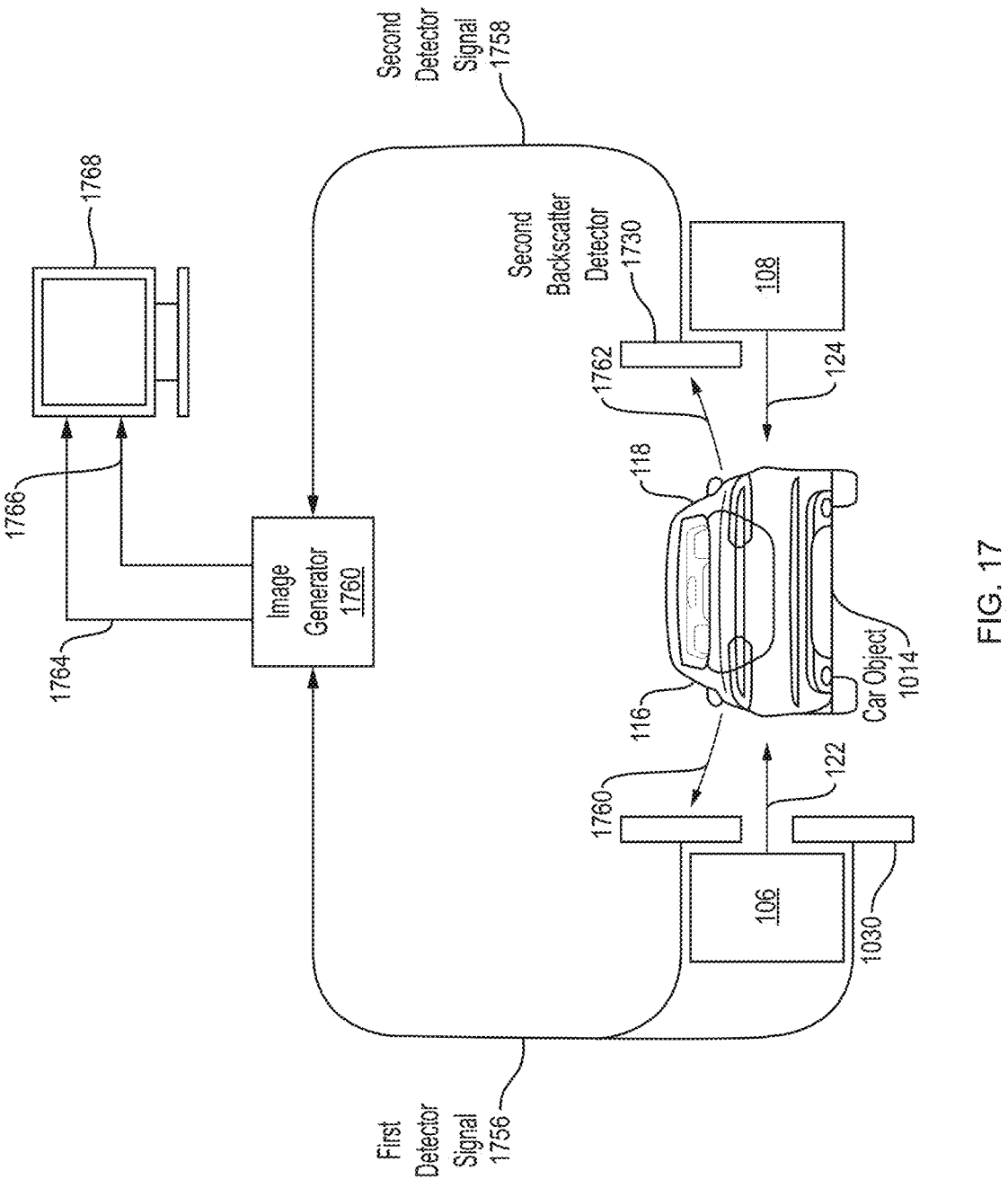
FIG. 17 is a schematic diagram of portions of an embodiment x-ray inspection system including first and second backscatter x-ray detectors, as well as an image generator that is configured to use signals from the backscatter detectors to generate first and second images of a scanned car.

FIG. 17 is a schematic diagram illustrating a flow of signals that may be implemented in embodiment systems in order to produce first and second backscatter images of a target object to be inspected. Shown in FIG. 17 are the car object 1014 at an inspection site, the first x-ray scanning module 106 outputting the scanning x-ray beam 122 toward the near side 116 of the car, and the second x-ray scanning module 108 outputting a scanning x-ray beam 124 toward the far side of the car. First backscattered x-ray radiation 1760 is scattered from the near side 116 of the car, and received at first backscatter detectors 1030. Second scattered x-ray radiation 1762 is scattered from the far side 118 of the car object 1014 and received at a second backscatter detector 1730.

The first backscatter detectors 1030 and the second backscatter detector 1730 produce first and second detector signals 1756 and 1758, respectively, in response to the respective scattered radiation 1760 and 1762, respectively. The signals 1756, 1758 are input into an image generator 1760, which is configured to create a first backscatter x-ray image from the first detector signal 1756 and a second backscatter x-ray image from the second detector signal 1758. The first and second backscatter images 1764, 1766, respectively, may be viewed at a monitor 1768 and viewed by an operator, for example, who is checking the images for contraband. In general, one or more image generators 1760 may be used to create the first and second backscatter images, or transmission images for systems that include transmission detectors, for example. An image generator 1760 can include a computer processor, for example.

Figure 18C:
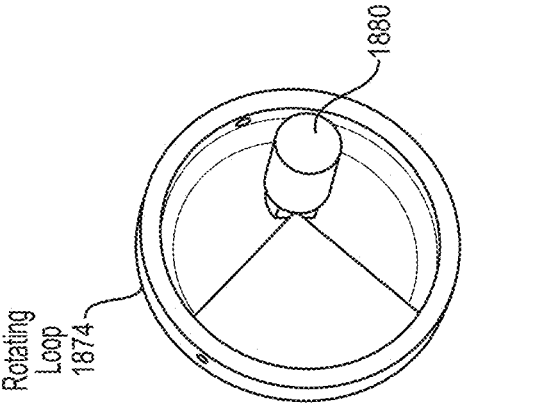
FIGS. 18A-18C (prior art) illustrate rotating disk, rotating wheel, and rotating hoop types of x-ray chopper wheels used for backscatter imaging systems.
Figure 18B:
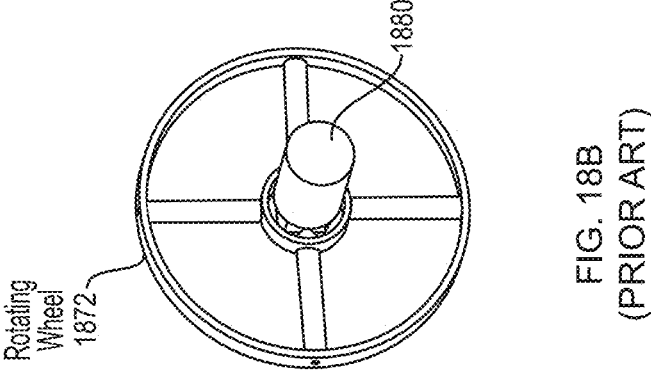
Figure 18A:
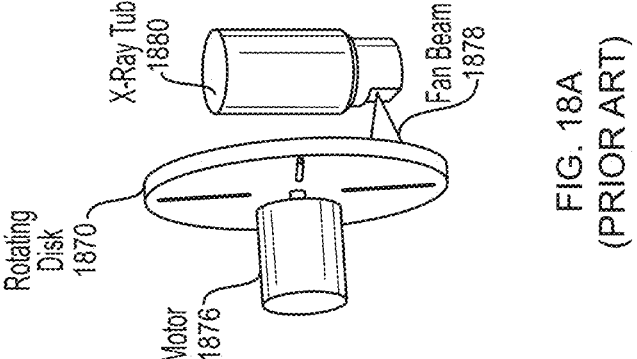

FIGS. 18A-18C illustrate three different types of existing x-ray chopper wheels used for generating a scanning pencil beam from a substantially stationary wide x-ray beam emanating from a tube or an intermediary collimation plate, for example. The chopper wheel of existing x-ray backscatter imaging systems usually is one of three basic types: a rotating disk 1870, a rotating wheel 1872, or a rotating hoop 1874. The three types are shown in FIGS. 18A-18C, respectively. More recently, a "tilted chopper wheel" version of the rotating disk 1870, shown in FIG. 19, has been developed, which may be very advantageously implemented in embodiments described herein.

Figures 19, 20:
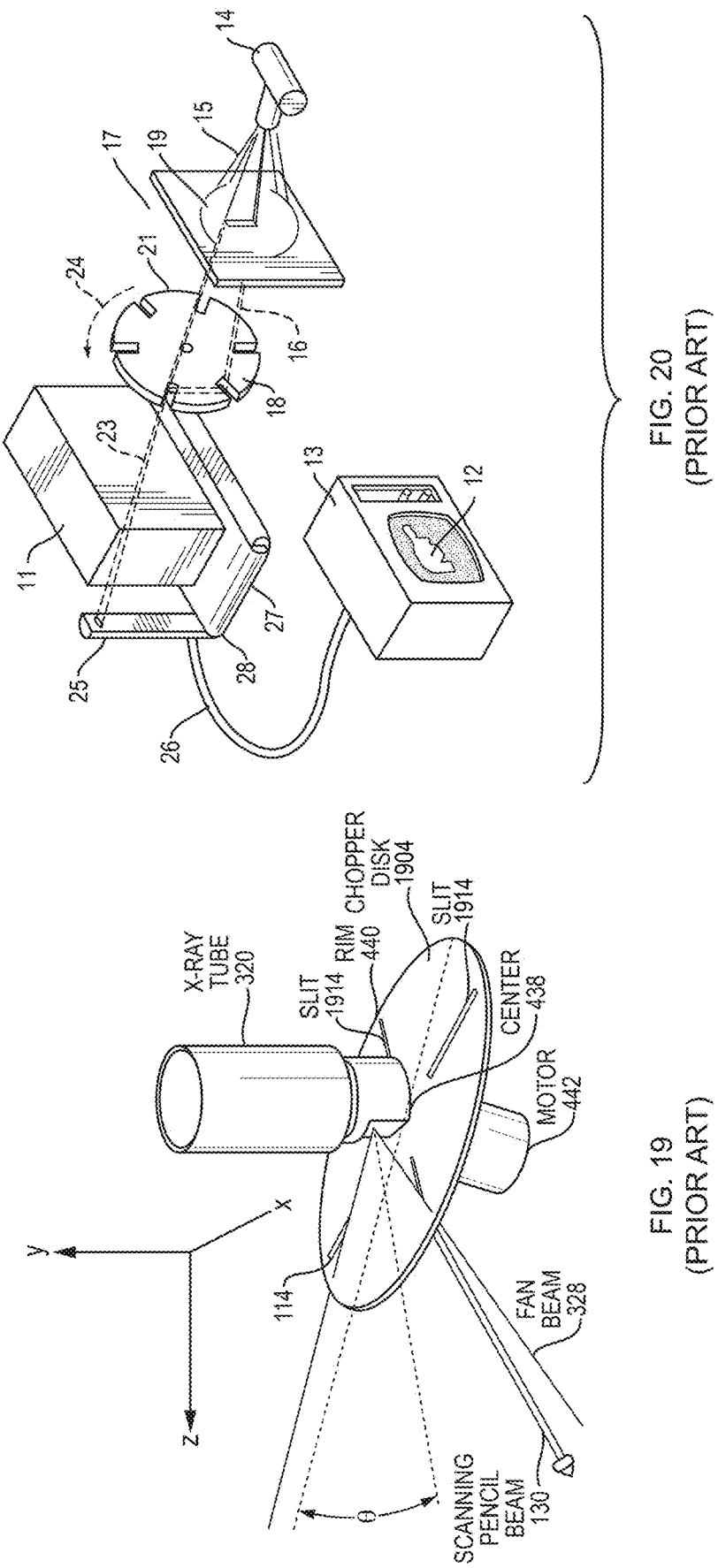
FIG. 19 (prior art) is a perspective-view illustration of a tilted disk chopper wheel x-ray scanning module that can be advantageously used in embodiments.
FIG. 20 (prior art) is a perspective-view illustration of an x-ray transmission imaging system utilizing a scanning beam of x-rays, illustrating principles applicable to backscatter and transmission x-ray imaging implemented in embodiment systems.

FIG. 19 is an illustration of an existing compact and relatively low-weight x-ray scanning module that uses a tilted disk. This design is ideally suited to all the mobile applications in the described embodiments herein, as it allows a smaller and lower-cost motorized vehicle with a lower maximum chassis load limit to be used. It also allows the trailer or cart that supports the secondary x-ray scanning module to be smaller, lighter, and more maneuverable. Thus, where the embodiments described herein may not have even been feasible or desirable previously, given the weight, expense, and difficulty of handling two massive chopper wheels in a given system, or one such massive chopper wheel on a mobile conveyance, the inventor has recognized that the tilted design can solve the long-standing problem of lacking dual-sided backscatter imaging on a mobile system. Tilted disk chopper wheels are described more fully in U.S. Pat. No. 10,762,998, which is hereby incorporated by reference herein in its entirety. This chopper wheel assembly is compact, and by tilting the disk, the assembly enables a disk design to be used at x-ray energies above 200 kV. The compactness and low weight of the tilted disk chopper wheel x-ray scanning module makes it ideal to be used on a mobile platform, and especially for a mobile dual-sided inspection system, which is the subject of this application.

FIG. 19 particularly illustrates an orientation of a fan beam 328 output from an x-ray tube 320 and disk chopper wheel 1904 in greater detail. The x-ray tube 320 is oriented with an axis in the Y direction. The fan beam 328 is oriented in the X-Z plane (the X-Z plane contains the fan beam 328). The plane of rotation of the chopper disk lies at an oblique non-perpendicular angle $\Theta$ to the X-Z plane. A scanning pencil beam 130 also is scanned in the X-Z plane, i.e., the beam plane, as the chopper disk rotates. The chopper disk 1904 includes a rim 440 and center 438, and the slits 1914 are oriented to extend radially toward the rim and center. The chopper disk 1904 is rotated by means of a motor 442.

The chopper disk 1904 is not oriented in either the X-Z plane or the X-Y plane, but, rather, in a disk plane that is at an angle $\Theta$ with respect to the beam plane (X-Z plane) of the fan beam 328. The disk plane can also be referred to as a plane of rotation (or rotational plane) of the chopper disk 1904, because the disk remains parallel to this plane as it rotates. The disk plane can be parallel to the X axis. By positioning the plane of the rotating disk at an acute (substantially non-perpendicular) angle $\Theta$ to the plane of the fan beam, the actual thickness of the disk can be reduced by a factor $F=1/\sin(\Theta)$ while keeping the disk's effective thickness the same. As used herein, "substantially non-perpendicular" indicates that the angle $\Theta$ is small enough to increase effective thickness significantly, such as increasing effective thickness by more than 25%, more than 50%, more than 100% (an effective thickness multiplier of 2), more than 200%, or more than 400%.

FIG. 20 illustrates the basic principle of backscatter imaging in reference to a transmission imaging system that uses a scanning x-ray beam. A standard x-ray tube (14) generates the x-rays that are collimated into a fan beam (16) by a slit aperture in attenuating plate (19). The fan beam is then "chopped" into a pencil beam by a rotating "chopper wheel" (18) with slit apertures (21), which scans over the object being imaged as the wheel rotates. The intensity of the x-rays scattered in the backwards direction is then recorded by one or more large-area backscatter detectors (not shown) as a function of the position of the illuminating beam. By moving the object through the plane containing the scanning beam, either on a conveyor (27) or under its own power, a two-dimensional backscatter image of the object is obtained.

Viken Detection® Corporation has recently filed a patent application on a low-profile x-ray scanning module specifically designed to be advantageously used in a backscatter imaging system that scans the undercarriage of a passing vehicle. This patent application is U.S. Provisional Pat. App. No. 63/135,150, filed on Jan. 8, 2021, which is hereby incorporated herein by reference in its entirety. It should be noted that any of the embodiments described in the current application can be augmented with such a system, allowing for three-sided inspection of a vehicle as it passes through the system. An example undercarriage backscatter imaging scanner is illustrated and described herein in connection with FIG. 14B.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. An x-ray inspection system comprising:
   a vehicle;
   a first x-ray scanning module configured to be transportable, via a transport of the vehicle, to an inspection site, the first x-ray scanning module further configured to irradiate, with a first x-ray scanning beam, a near side of an object to be inspected at the inspection site;
   a mobile conveyance; and
   a second x-ray scanning module configured to be transportable to the inspection site via a combination of the mobile conveyance and the vehicle, the second x-ray scanning module further configured to be movable and positioned at a chosen position relative to the first x-ray scanning module at the inspection site, via the mobile conveyance, to irradiate, with a second x-ray scanning beam, a far side of the object to be inspected,
   wherein the vehicle and the mobile conveyance are configured to be mechanically coupled together during the transport to the inspection site and to be mechanically decoupled from each other at the inspection site.

2. The system of claim 1, wherein the mobile conveyance is a cart, and wherein the second x-ray scanning module is configured to be mechanically coupled to the cart during the transport and during the irradiation with the second x-ray scanning beam, the cart configured to be removable, with the second x-ray scanning module, from the vehicle at the inspection site.

3. The system of claim 2, wherein the first x-ray scanning module is configured to be mounted at the vehicle during the transport and during the irradiation with the first x-ray scanning beam.

4. The system of claim 2, wherein the mobile conveyance is a first mobile conveyance, the system further including a second mobile conveyance configured to be mechanically coupled to the vehicle during the transport to the inspection site and to be mechanically decoupled from the vehicle at the inspection site, wherein the first x-ray scanning module is configured to be moveable and positioned at the inspection site, via the second mobile conveyance, to irradiate, with the first x-ray scanning beam, the near side of the object to be inspected.

5. The system of claim 4, wherein the second mobile conveyance is a cart, and wherein the first x-ray scanning module is configured to be mechanically coupled to the cart during the transport and during the irradiation with the first x-ray scanning beam, the cart configured to be removable, with the first x-ray scanning module, from the vehicle at the inspection site.

6. The system of claim 1, further including a trailer configured to be towed by the vehicle during the transport, and wherein the mobile conveyance is configured to be secured at the trailer during the transport and to be removable from the trailer at the inspection site.

7. The system of claim 1, wherein the mobile conveyance is a first mobile conveyance and is a trailer configured to be towed by the vehicle during the transport, and wherein the second x-ray scanning module is configured to be mechanically coupled to the trailer during the transport and during the irradiation with the second x-ray scanning beam.

8. The system of claim 7, wherein the first x-ray scanning module is configured to be mounted at the vehicle during the transport and during the irradiation with the first x-ray scanning beam.

9. The system of claim 7, wherein the first x-ray scanning module is configured to be mechanically coupled to a cart during the transport and during the irradiation with the first x-ray scanning beam, the cart configured to be mechanically coupled to the vehicle or to the trailer during the transport and to be mechanically decoupled from the vehicle or from the trailer at the inspection site.

10. The system of claim 1,
   further comprising a trailer configured to be towed by the vehicle for the transport to the inspection site,
   and wherein the mobile conveyance is a first mobile conveyance, the system further comprising a second mobile conveyance, the first x-ray scanning module configured to be movable and positioned, via the second mobile conveyance, to irradiate, with the first x-ray scanning beam, the near side of the object to be inspected at the inspection site,
   and wherein the first and second mobile conveyances are configured to be mechanically coupled to the trailer during the transport to the inspection site and to be mechanically decoupled from the trailer, with the second and first x-ray scanning modules, respectively, at the inspection site for the irradiation with the second and first x-ray scanning beams, respectively.

11. The system of claim 1, wherein the first x-ray scanning module, the second x-ray scanning module, or both incorporate a tilted disk chopper wheel assembly.

12. The system of any claim 1, further including a transmission detector configured to detect x-rays from the first or second x-ray scanning beam that are transmitted through the object.

13. The system of claim 12, wherein the transmission detector is mounted to a trailer that is configured to be towed by the vehicle during the transport.

14. The system of claim 12, wherein the transmission detector is mounted to the vehicle.

15. The system of claim 12, wherein the transmission detector is a dual-energy detector.

16. The system of claim 12, wherein the transmission detector is configured to be stowed, during the transport, in the vehicle or in a trailer that is configured to be towed by the vehicle during the transport.

17. The system of claim 1, wherein the first and second x-ray scanning modules are configured to output the first and second x-ray scanning beams, respectively, to be temporally interleaved with each other.

18. The system of claim 1, further including a third x-ray scanning module that is configured to be transported to the inspection site by the vehicle or by a trailer that is configured to be towed by the vehicle during the transport, and wherein the third x-ray scanning module is configured to be positioned at an underside of the object and to output a third x-ray scanning beam toward the underside.

19. The system of claim 1, further including:

one or more first backscatter detectors configured to produce a first detector signal in response to radiation scattered from the near side of the object;

one or more second backscatter detectors configured to produce a second detector signal in response to radiation scattered from the far-side of the object; and one or more image generators configured to create a first backscatter image from the first detector signal and a second backscatter image from the second detector signal.

20. An x-ray inspection system comprising:

a trailer configured to be towed by a vehicle for a transport to an inspection site;

a first x-ray scanning module configured to be transportable, via the trailer, to the inspection site, the first x-ray scanning module further configured to irradiate, with a first x-ray scanning beam, a near side of an object to be inspected at the inspection site;

a second x-ray scanning module; and a mobile conveyance configured to be mechanically coupled to the trailer during the transport to the inspection site and to be mechanically decoupled from the trailer, with the second x-ray scanning module, at the inspection site, wherein the second x-ray scanning module is configured to be movable and positioned at a chosen position relative to the first x-ray scanning module at the inspection site, via the mobile conveyance, to irradiate, with a second x-ray scanning beam, a far side of the object to be inspected.

21. The system of claim 20, wherein the first x-ray scanning module is configured to be mechanically coupled to the trailer during the transport to the inspection site and during the irradiation of the near side of the object with the first x-ray scanning beam.

22. The system of claim 20, wherein the mobile conveyance is a first mobile conveyance, the system further comprising a second mobile conveyance configured to be mechanically coupled to the trailer during the transport to the inspection site and to be mechanically decoupled from the trailer, with the first x-ray scanning module, at the inspection site, the first x-ray scanning module configured to be movable and positioned, via the second mobile conveyance, to irradiate, with the first x-ray scanning beam, the near side of the object to be inspected.

23. The system of claim 20, wherein the first x-ray scanning module, the second x-ray scanning module, or both incorporate a tilted disk chopper wheel assembly.

* * * * *